(12) United States Patent
Pai

(10) Patent No.: US 8,994,204 B2
(45) Date of Patent: Mar. 31, 2015

(54) HIGH EFFICIENCY WATERWHEEL APPARATUS HAVING TRACK-TYPE BLADES AND A TRACK-TYPE BLADE SET THEREOF

(75) Inventor: Chin-Yen Pai, Kaohsiung (TW)

(73) Assignees: Chen-Yi Pai, Kaohsiung (TW); Chin-Li Pai, Kaohsiung (TW)

( * ) Notice: Subject to any disclaimer, the term of this patent is extended or adjusted under 35 U.S.C. 154(b) by 881 days.

(21) Appl. No.: 13/223,619

(22) Filed: Sep. 1, 2011

(65) Prior Publication Data

US 2012/0139251 A1    Jun. 7, 2012

(30) Foreign Application Priority Data

Dec. 6, 2010    (TW) ................ 99142454 A

(51) Int. Cl.
  *F03B 13/00*    (2006.01)
  *F03B 17/06*    (2006.01)
  *B63H 1/08*    (2006.01)

(52) U.S. Cl.
  CPC ........... *F03B 17/067* (2013.01); *F05B 2240/13* (2013.01); *F05B 2240/40* (2013.01); *B63H 1/08* (2013.01); *F05B 2260/506* (2013.01); *F05B 2260/63* (2013.01); *F05B 2260/72* (2013.01); *F05B 2260/79* (2013.01); *Y02E 10/28* (2013.01)
  USPC ......................................................... 290/54

(58) Field of Classification Search
  CPC ............. F05B 2260/72; F05B 2260/63; F03B 17/067; B63H 1/08
  USPC ............. 290/43, 44, 54, 55; 415/2.1, 4.1, 4.3, 415/4.5
  See application file for complete search history.

(56) References Cited

U.S. PATENT DOCUMENTS 1,787,103 A    12/1930    Caldwell
5,324,164 A *    6/1994    Doering et al. ................ 415/150

(Continued)

FOREIGN PATENT DOCUMENTS

DE    866 764    2/1953
EP    1 394 039 A1    3/2004

(Continued)

OTHER PUBLICATIONS

Search report issued by the European Patent Office on Mar. 20, 2013 for the counterpart EP Patent Application No. 11180170.0.

(Continued)

*Primary Examiner* — Julio Gonzalez
*Assistant Examiner* — Viet Nguyen
(74) *Attorney, Agent, or Firm* — WPAT, P.C.; Anthony King; Kay Yang

(57) ABSTRACT

The invention relates to a high efficiency waterwheel apparatus having track-type blades and a track-type blade set thereof, which includes at least one track disk, a plurality of moving elements and a plurality of blades. The track disk has at least one track surrounding a central axis of the track disk. The moving elements move in the track. The blades are connected to the moving elements. The blades are pushed by water flow to revolving around a central axis. The moving elements connected to the blades are guided by a track so that the blades have different angles while revolving to different positions of the track. Thus, the blade set rotate at a variable angular velocity. When the track-type blade set is applied for power generation, the power generation efficiency is improved in a low-speed ocean current.

36 Claims, 25 Drawing Sheets

(56) References Cited

U.S. PATENT DOCUMENTS

| | | | | |
|---|---|---|---|---|
| 5,553,996 | A * | 9/1996 | Farrar | 415/2.1 |
| 5,676,524 | A * | 10/1997 | Lukas | 416/17 |
| 6,688,842 | B2 * | 2/2004 | Boatner | 415/4.2 |
| 7,686,583 | B2 * | 3/2010 | Siegel | 416/111 |
| 8,664,784 | B2 * | 3/2014 | Janca et al. | 290/43 |
| 2007/0296218 | A1 * | 12/2007 | Jonsson | 290/55 |
| 2008/0315588 | A1 * | 12/2008 | Burg | 290/52 |
| 2010/0284808 | A1 * | 11/2010 | Pai | 416/98 |
| 2012/0003089 | A1 * | 1/2012 | Byreddy et al. | 416/61 |

FOREIGN PATENT DOCUMENTS

| | | | | |
|---|---|---|---|---|
| JP | 03206400 | A * | 9/1991 | F04D 29/70 |
| TW | 495586 | | 7/2002 | |
| TW | 200408767 | | 6/2004 | |
| TW | 200817238 | | 4/2008 | |
| TW | 200835852 | | 9/2008 | |
| TW | 200844325 | | 11/2008 | |
| TW | 200930895 | | 7/2009 | |
| TW | 200940822 | | 10/2009 | |
| TW | 201007009 | | 2/2010 | |
| TW | 201009188 | | 3/2010 | |
| WO | WO 02052149 | A1 | 7/2002 | |

OTHER PUBLICATIONS

English translation of DE 866 764.

Search report issued by the European Patent Office on Mar. 20, 2013 for the counterpart EP Patent Application No. 11180172.6.

* cited by examiner

US 8,994,204 B2

HIGH EFFICIENCY WATERWHEEL APPARATUS HAVING TRACK-TYPE BLADES AND A TRACK-TYPE BLADE SET THEREOF

BACKGROUND OF THE INVENTION

1. Field of the Invention

The present invention relates to a waterwheel apparatus, and more particularly to a high efficiency waterwheel apparatus having track-type blades and a track-type blade set thereof.

2. Description of the Related Art

In general points of view, it is considered that only a high-speed water flow is worthy of development, and therefore, research and development on a waterwheel apparatus is carried out for the high-speed water flow (over 2.75 m/s), for example, Taiwan (R.O.C.) patent publication No. 200835852 entitled "WIND-FORCE OR WATER-FORCE POWER GENERATION DEVICE" and Taiwan (R.O.C.) patent publication No. 200844325 entitled "A METHOD AND APPARATUS FOR OPERATING AN UNDERWATER POWER PLANT" disclose the related invention. At present, the location of the high-speed water flow (over 2.75 m/s) around the world is few, or is not suitable for commercial use as the water flow is far away from the land; while a low-speed water flow (0.5 m/s to 2 m/s, for example, an ocean current in 30 m to 50 m water depth) is widely distributed, for example, the fastest flow rate of Pacific Kuroshio in the east of Taiwan is about 1.4 m/s, which falls in the category of the low-speed water flow. However, it is generally considered that the low-speed water flow is not worthy of development, so no one is willing to develop a high efficiency waterwheel apparatus applicable to the low-speed water flow. It is a great pity that such water flow energy is gratuitously wasted in the case of energy shortage and emphasis on environmentally-friendly and renewable energy at present.

A power unit of the waterwheel apparatus for water flow power generation has two types of technologies: a propeller type (for example, Taiwan (R.O.C.) patent publication No. 200817238 entitled "FLUID ENERGY CONVERTER", Taiwan (R.O.C.) patent publication No. 200930895 entitled "WATER FLOW POWER GENERATION DEVICE", and Taiwan (R.O.C.) patent publication No. 201009188 entitled "WATER FORCE POWER GENERATION DEVICE") and a rotary blade type (for example, Taiwan (R.O.C.) patent publication No. 201007009 entitled "WATER WHEEL IMPELLER TYPE POWER GENERATOR", Taiwan (R.O.C.) patent publication No. 200408767 entitled "WATER LEVEL KINETIC ENERGY GENERATION MECHANISM", and Taiwan (R.O.C.) patent No. 495586 entitled "MARINE ENERGY DRIVEN PUMP (SECOND CASE)"). When the propeller-type power unit is applied to the water flow, since a viscosity coefficient of the water is much greater than that of the air, a high frictional resistance is formed, so a sufficient rotation speed or torque is not easily obtained, and therefore, such a power unit is not a desirable water flow power generation unit. By contrast, the rotary-blade-type power unit is a better water flow power generation unit. However, since the blades of the conventional rotary-blade-type waterwheel apparatus are fixed, when the waterwheel rotates to a counterflow side, a resistance is formed, which reduces the application efficiency of the water flow energy, and even causes the waterwheel to stop rotating. Therefore, many problems remain to be solved.

For example, FIG. 1 is a schematic view of a conventional rotary-blade-type waterwheel apparatus disclosed in Taiwan (R.O.C.) patent No. 495586 entitled "MARINE ENERGY DRIVEN PUMP (SECOND CASE)". The waterwheel apparatus 1 includes a rotating disk 11 and a plurality of blades 12. The blades 12 are fixedly disposed on the rotating disk 11, and when the blades 12 are driven by a water flow 14, the rotating disk 11 also rotates accordingly, thus driving an axle center of a power generator (not shown) to rotate and generate power. When the waterwheel apparatus 1 is placed in the water flow 14, the blades 12 in a lower area C directly face the water flow 14 by their front surfaces, and bear the maximum thrust, which drives the waterwheel apparatus to rotate counter-clockwise. However, as the blades 12 are fixed to the rotating disk 11, it is the back surface of the blades 12 in an upper area D that faces the water flow 14, which bear a thrust having the same magnitude as the thrust applied on the blade 12 in the area C but in a opposite direction. Therefore, the rotating forces applied to the rotating disk 11 in the two areas are counteracted, so that the waterwheel apparatus 1 has a low efficiency and is merely applicable to a high-speed water flow.

Further, in a conventional waterwheel apparatus, a planetary gearbox device is used to change angles of blades. FIG. 2 is a schematic view of Taiwan (R.O.C.) patent publication No. 200940822 entitled "WATERWHEEL APPARATUS HAVING SOLAR-PLANETARY TYPE BLADES". Referring to FIG. 2, when the blades of the waterwheel apparatus revolve around a central axis, the blades rotate at the same time. When the blades revolve to a counterflow position, they already rotate to a direction parallel to the water flow, which reduces the resistance. Therefore, an effective area of the blades is much larger than an ineffective area, and the power generation efficiency is improved accordingly. In this prior art, a transmission mechanism is mainly used to change the angles of multiple blades, and maintain the same angle difference between the blades. It indicates that the transmission mechanism may be a planetary gearbox in one embodiment. However, the conventional transmission mechanism is a closed planetary gearbox, and lubricating oil needs to be added into the planetary gearbox. When the waterwheel apparatus is completely placed in water during operation, a sealing member in an axle rotating portion becomes rather important. If the lubricating oil inside the planetary gearbox leaks due to a poor sealing effect, the marine environment may be polluted. Therefore, in order to maintain the sealing effect of the sealing member, the maintenance cost of such a waterwheel apparatus is dramatically increased.

In addition, the undersea operation mechanism such as the conventional waterwheel apparatus mostly adopts antifouling coating to decelerate the growth speed of the marine organism, but the effect is undesirable, and it still needs to scrape the marine organism accretion and re-coat the antifouling coating regularly, so that the consumed labor and materials also raise the cost for maintaining the waterwheel apparatus.

The components for constructing the planetary gearbox are numerous, and at least five gear sets with different functions and applications are used in the prior art. Each of the gear sets is respectively configured with elements such as a pivot, a bearing, and a sealing member. In order to keep a valid blade angle, the same angle difference between the multiple blades needs to be maintained, and therefore, a large number of various spares are need to be prepared for replacement during maintenance. However, when the spare such as a gear is replaced, the complex assembly structure causes the replacement to be rather troublesome and error-prone, and the maintenance work is delayed accordingly.

Moreover, the conventional transmission mechanism is limited to the case that the gear is a transmission device, and the rotation of the multiple blades is set at a fixed angular velocity in order to maintain the same angle difference between the blades. Therefore, for the waterwheel design, an optimal scheme can only be made by using a collector mask and change of the shape of the blades, so the obtained effect is also limited.

Therefore, the waterwheel apparatus used for water flow power generation still has many technical problems to be solved.

SUMMARY OF THE INVENTION

The present invention provides a high efficiency waterwheel apparatus having track-type blades and a track-type blade set thereof. The blades is connected to the moving elements disposed on the track disk, so as to form a waterwheel apparatus. The waterwheel apparatus has a revolution motion, and the blades rotate at a variable angular velocity.

The present invention further provides a high efficiency waterwheel apparatus having track-type blades and a track-type blade set thereof. When some of the blades revolve to the counterflow area, they rotate to be parallel or substantially parallel to the water flow direction, thereby reducing the resistance thrust in the counterflow area.

The present invention further provides a high efficiency waterwheel apparatus having track-type blades and a track-type blade set thereof. When being applied to a low-speed ocean current, it can generate electricity smoothly.

The present invention further provides a high efficiency waterwheel apparatus having track-type blades and a track-type blade set thereof. A transmission mechanism such as a gear is not needed, and the use of lubricating oil is avoided and no leakage occurs to pollute the marine environment.

The present invention further provides a high efficiency waterwheel apparatus having track-type blades and a track-type blade set thereof. A decontamination apparatus is disposed in the waterwheel apparatus, and the marine organism accretion on the blades is synchronously removed, thereby maintaining the operation efficiency and reducing the maintenance cost.

The present invention further provides a track-type blade set, which comprises at least one track disk, a plurality of moving elements and a plurality of blades. The track disk has at least one track and a central axis, wherein the at least one track surrounds the central axis. The moving elements move in the at least one track. The blades are connected to the moving elements, wherein the blades rotate at a variable angular velocity when revolving around the central axis.

The present invention further provides a high efficiency waterwheel apparatus having track-type blades, which comprises a frame and at least one track-type blade set fixed to the frame. Each track-type blade set comprises at least one track disk, a plurality of moving elements and a plurality of blades. The track disk has at least one track and a central axis, wherein the at least one track surrounds the central axis. The moving elements move in the at least one track. The blades are connected to the moving elements, wherein the blades rotate at a variable angular velocity when revolving around the central axis.

In one embodiment of the present invention, the blades are pushed by water flow to revolving around a central axis of a rotating disk. The moving elements connected to the blades are guided by a track and has different angles at different positions of the track. Thus, the blade set rotate at a variable angular velocity. Preferably, when some of the blades revolve to the counterflow area, they rotate to be parallel to the water flow direction, thereby reducing the resistance thrust. Whereby, when the track-type blade set is applied for power generation, the power generation efficiency is improved in a low-speed ocean current. In another embodiment of the present invention, the track-type blade set is guided by a track of a track disk, and rotate and revolve at the same time. Thus, a transmission mechanism such as a gear is not needed, and the use of lubricating oil is avoided and no leakage occurs to pollute the environment. In another embodiment of the present invention, a decontamination brush is disposed in the waterwheel apparatus, and the marine organism accretion on the blades is synchronously removed, thereby maintaining the operation efficiency and prolonging an operation cycle, and further reducing the maintenance cost.

As given above, according to the combination of the moving elements disposed on the track disk and the blades of the present invention, the blades rotate at a variable angular velocity, thereby reducing the resistance thrust in the counterflow area, and it can generate electricity smoothly at a low-speed ocean current.

DETAILED DESCRIPTION OF THE INVENTION

Figure 1:
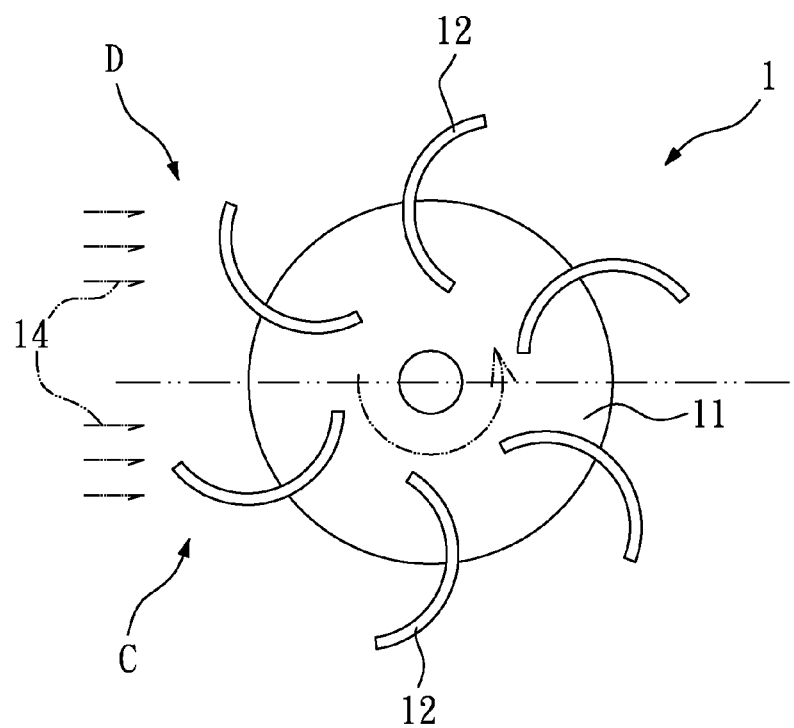
FIG. 1 is a schematic view of a conventional rotary-blade-type waterwheel apparatus disclosed in Taiwan (R.O.C.) patent No. 495586.
Figure 2:
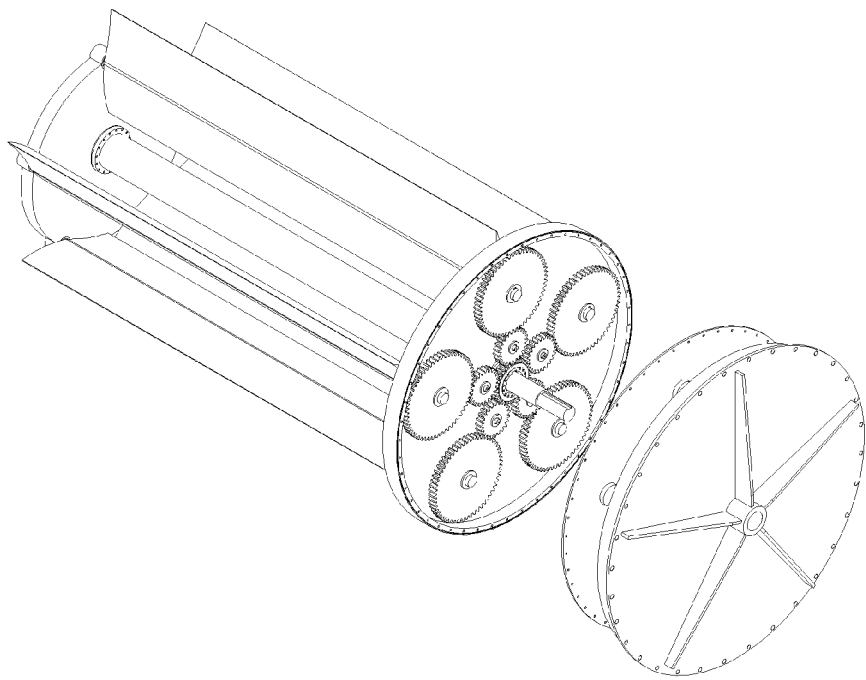
FIG. 2 is a schematic view of a conventional waterwheel apparatus having solar-planetary type blades in Taiwan (R.O.C.) patent publication No. 200940822.

In order to further describe the embodiments, the accompanying drawings are provided in the present invention. The drawings are a part of the disclosure of the present invention for describing the embodiments, and may explain the operation principle of the embodiments with reference to the related description in the specification. People having ordinary skill in the art may understand other possible embodiments and the advantages of the present invention with reference to the content. The components in the drawings are not drawn in proportion, and similar symbols are generally used for indicating similar components.

Based on an idea that a widely distributed low-speed remote ocean current such as Taiwan east coast abundant ocean current generates energy, the present invention provides a waterwheel apparatus composed by a track-type blade set, so that electricity is generated by effectively using a low-speed ocean current in the condition that the water flow rate is reduced to merely 1 m/s. It is known from analysis and calculation based on a hydrodynamic principle that, in a process that a plurality of blades revolves around a central fixed portion and rotates at the same time, when varied angle differences are formed with the blades revolving to different positions and rotating to different angles, that is, when the multiple blades rotate at a variable angular velocity, a resistance of the blades formed at a counterflow position is reduced and the power generation efficiency of the waterwheel apparatus is improved. In addition, by using a collector mask, change of the shape of the blades, and the variable angular velocity, a negative effect of an ineffective area is further reduced, and positive output of an effective area is increased, thereby greatly enhancing the power generation efficiency of the waterwheel apparatus. In this specification, "blades revolve" refers to that all blades circularly move around a central axis as a rotation center, and "blades rotate" refers to that a single blade rotates with an axis penetrating therein as a rotation center.

Therefore, in the waterwheel apparatus with the track-type blade set according to the design of the present invention, a gear component is omitted, so as to simplify the types of the components and the maintenance step, and the use of lubricating oil is avoided and no leakage occurs to contaminate the marine environment. In addition, the blade set rotates at a variable angular velocity, which reduces the resistance, so that the negative effect of the ineffective area of the blade set is reduced and the positive output of the effective area is increased at the same time, thereby improving the water flow energy conversion efficiency of the waterwheel apparatus with the blade set. Moreover, a decontamination brush is disposed in the waterwheel apparatus, and the marine organism accretion on the blades is synchronously removed, thereby maintaining the operation efficiency and prolonging an operation cycle, and further reducing the maintenance cost.

Figure 3:
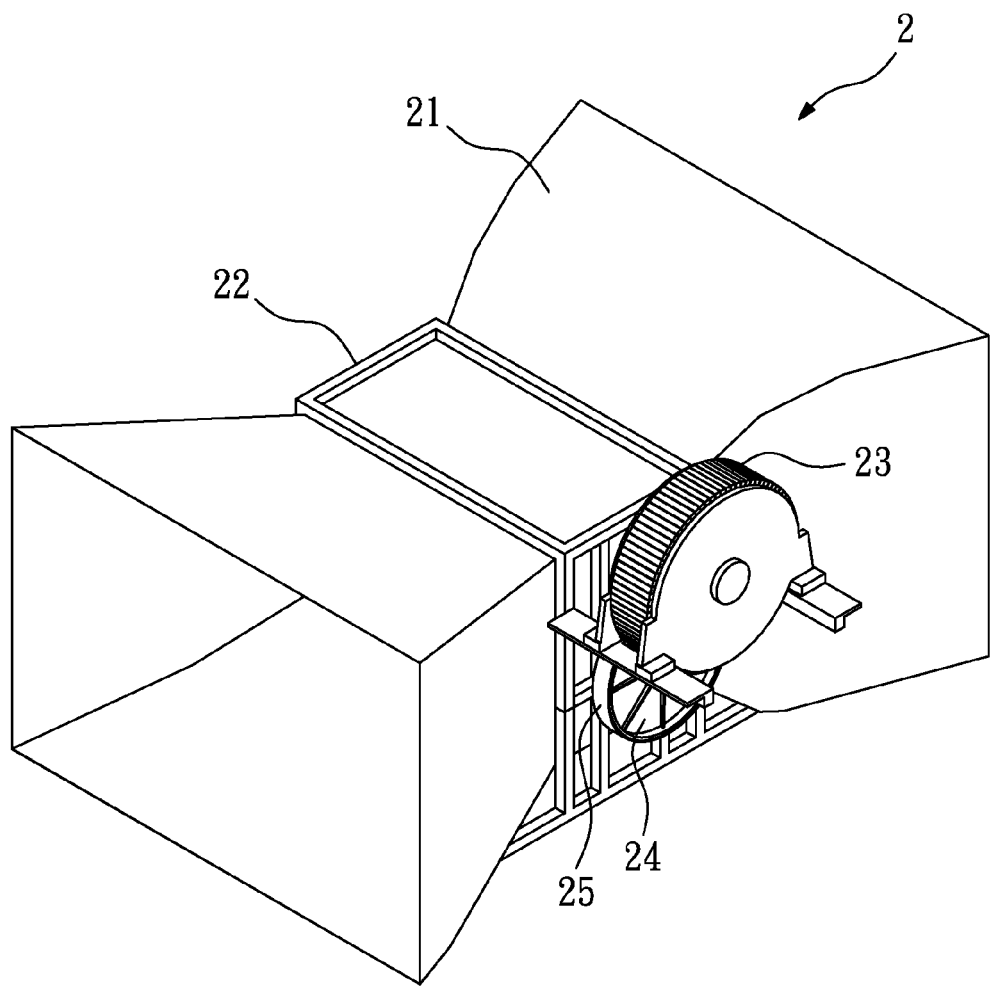
FIG. 3 is a schematic perspective view of a high efficiency waterwheel apparatus having track-type blades according to a first embodiment of the present invention.
Figure 4:
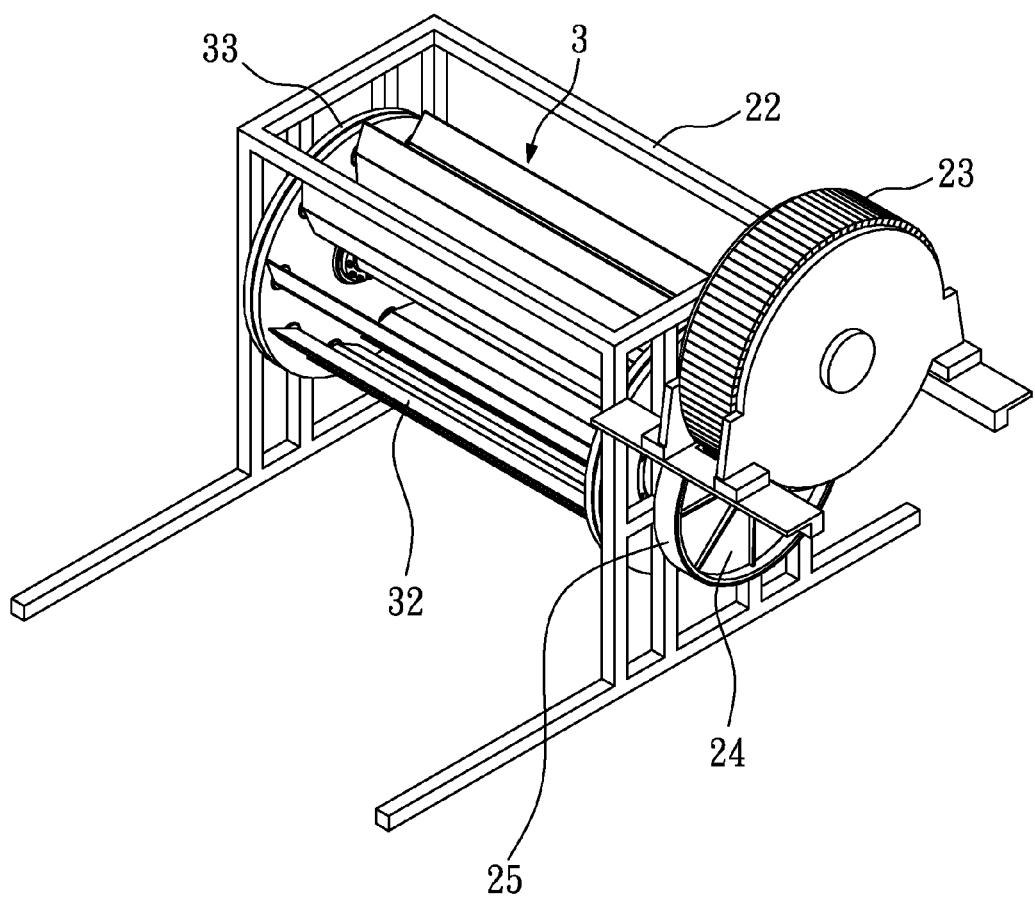
FIG. 4 is a schematic perspective view of the high efficiency waterwheel apparatus having track-type blades according to the first embodiment of the present invention when a collector mask is removed.

Please referring to FIG. 3 and FIG. 4 together, wherein FIG. 3 is a schematic perspective view of a high efficiency waterwheel apparatus having track-type blades according to a first embodiment of the present invention, and FIG. 4 is a schematic perspective view of the high efficiency waterwheel apparatus having track-type blades according to the first embodiment of the present invention when a collector mask is removed. The entire high efficiency waterwheel apparatus 2 having track-type blades can be operated under water, but is not limited thereto. The waterwheel apparatus 2 includes a frame 22, at least one track-type blade set 3 and a power unit 23. In this embodiment, the frame 22 is a main support structure. The track-type blade set 3 is fixed to the frame 22. The power unit 23 has an axle center (not shown), and the axle center rotates together with a rotating disk 33 (FIG. 4) and a central transmission shaft 34 (FIG. 8) of the track-type blade set 3.

Figure 8:
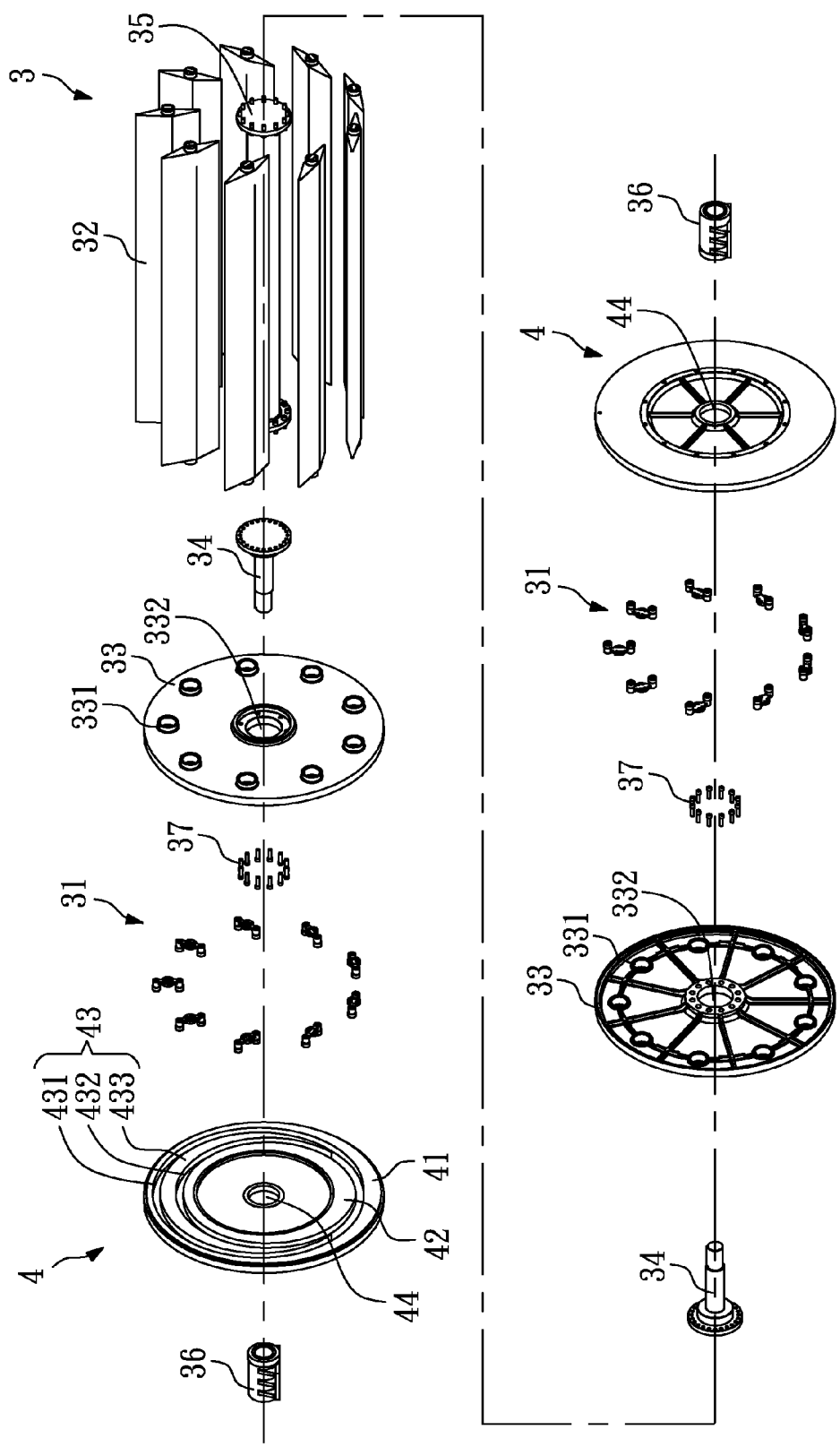
FIG. 8 is a schematic exploded view of the track-type blade set according to the third embodiment of the present invention.

In this embodiment, as shown in FIG. 4, the waterwheel apparatus 2 having track-type blades further includes a pulley 24 and a belt 25. The rotating disk 33 of the track-type blade set 3 is connected to the pulley 24 by the central transmission shaft 34 (FIG. 8), and the belt 25 is fitted on the pulley 24 and the axle center of the power unit 23. Thus, the axle center rotates together with the rotating disk 33 and the central transmission shaft 34 (FIG. 8).

The power unit 23 may be a power generator, a power source (for example, an electric motor), or any other device that can do work. In other words, the applications of the waterwheel apparatus 2 having track-type blades include, but are not limited to, the following three cases: the first case is used for generating power, the second case is used for producing a flowing water flow, and the third case is used for doing work.

In the first case, the power unit 23 is a power generator. The blades 32 of the track-type blade set 3 are pushed by a water flow, and the rotating disk 33 and the central transmission shaft 34 (FIG. 8) are forced to rotate accordingly, thus driving the axle center of the power unit 23 to rotate and generate power.

In the second case, the power unit 23 is a power source (for example, an electric motor). The power source is used to drive the rotating disk 33 and the central transmission shaft 34 (FIG. 8) of the track-type blade set 3, and the blades 32 of the track-type blade set 3 are forced to rotate accordingly, thus producing a flowing water flow.

In the third case, the power unit 23 is a device that can do work. The blades 32 of the track-type blade set 3 are pushed by a water flow, and the rotating disk 33 and the central transmission shaft 34 (FIG. 8) of the track-type blade set 3 are forced to rotate accordingly, thus driving the axle center of the power unit 23 to rotate and do work, for example, channel aeration to improve water quality.

The marine organism accretion easily occurs under the sea, which reduces the operation efficiency of the blades hugely over a long period and shortens the operation life. Therefore, preferably, the waterwheel apparatus 2 having track-type blades further comprises a collector mask 21 on which a decontamination brush is disposed. The collector mask 21 covers the track-type blade set 3 for guiding the direction of the water flow and increasing the velocity and pressure of the water flow, so that the water flow can generate or exert a great power. The decontamination brush can remove the marine organism that may accrete on the track-type blade set 3, so as to maintaining the operation efficiency.

Figure 5:
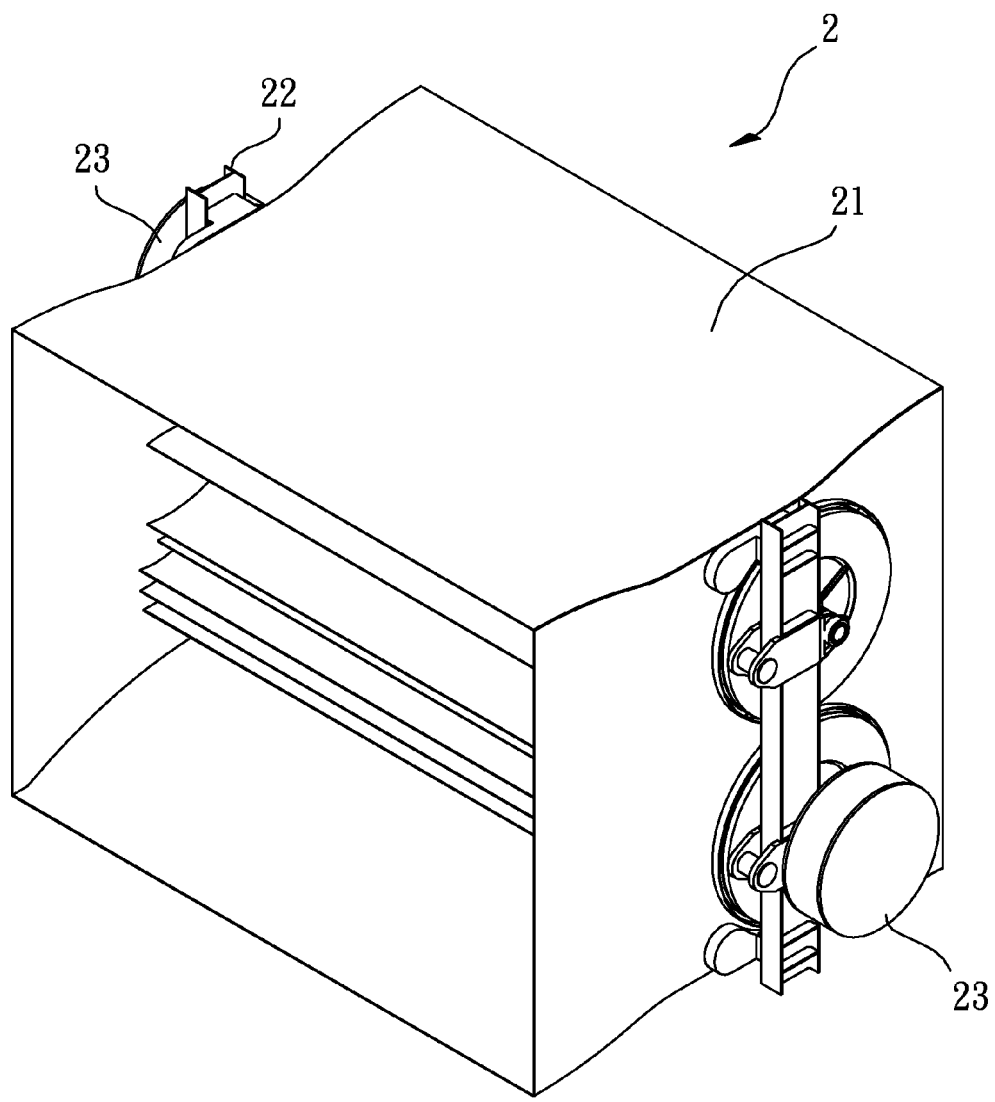
FIG. 5 is a schematic perspective view of a high efficiency waterwheel apparatus having track-type blades according to a second embodiment of the present invention.
Figure 6:
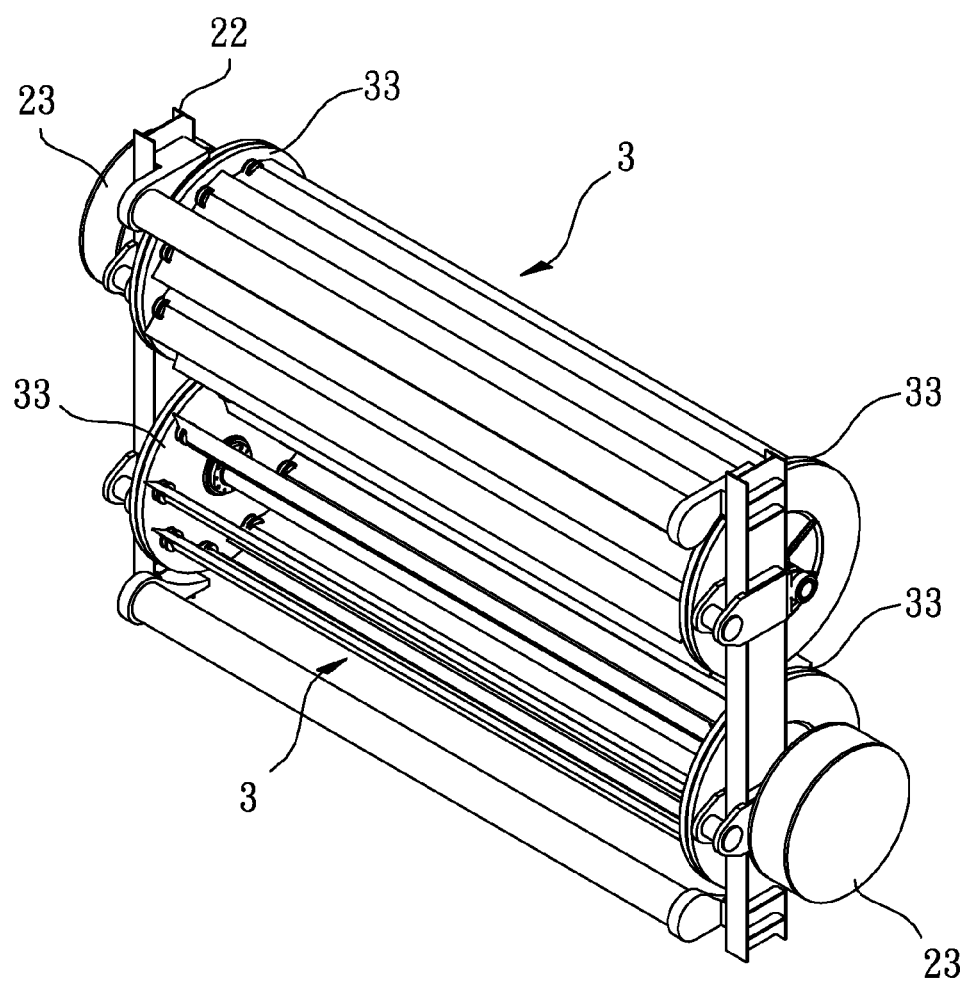
FIG. 6 is a schematic perspective view of the high efficiency waterwheel apparatus having track-type blades according to the second embodiment of the present invention when a collector mask is removed.

Please referring to FIG. 5 and FIG. 6 together, wherein FIG. 5 is a schematic perspective view of a high efficiency waterwheel apparatus having track-type blades according to a second embodiment of the present invention, and FIG. 6 is a schematic perspective view of the high efficiency waterwheel apparatus having track-type blades according to the second embodiment of the present invention when a collector mask is removed. The difference between this embodiment and the first embodiment lies in that the high efficiency waterwheel apparatus 2 having track-type blades of this embodiment includes two track-type blade sets 3. The type and structure of the collector mask 21, the frame 22 and the power unit 23 can be adjusted by requirement, environment or other factors. In this embodiment, the two power units 23 are examples of prior art, and the type and structure of the collector masks 21 and the frames 22 are changed accordingly. Because of the type of the power unit 23 of this embodiment, the axle center of the power unit 23 connects the central transmission shaft 34 (FIG. 8) of the track-type blade set 3 directly and rotates synchronously.

Figure 7:
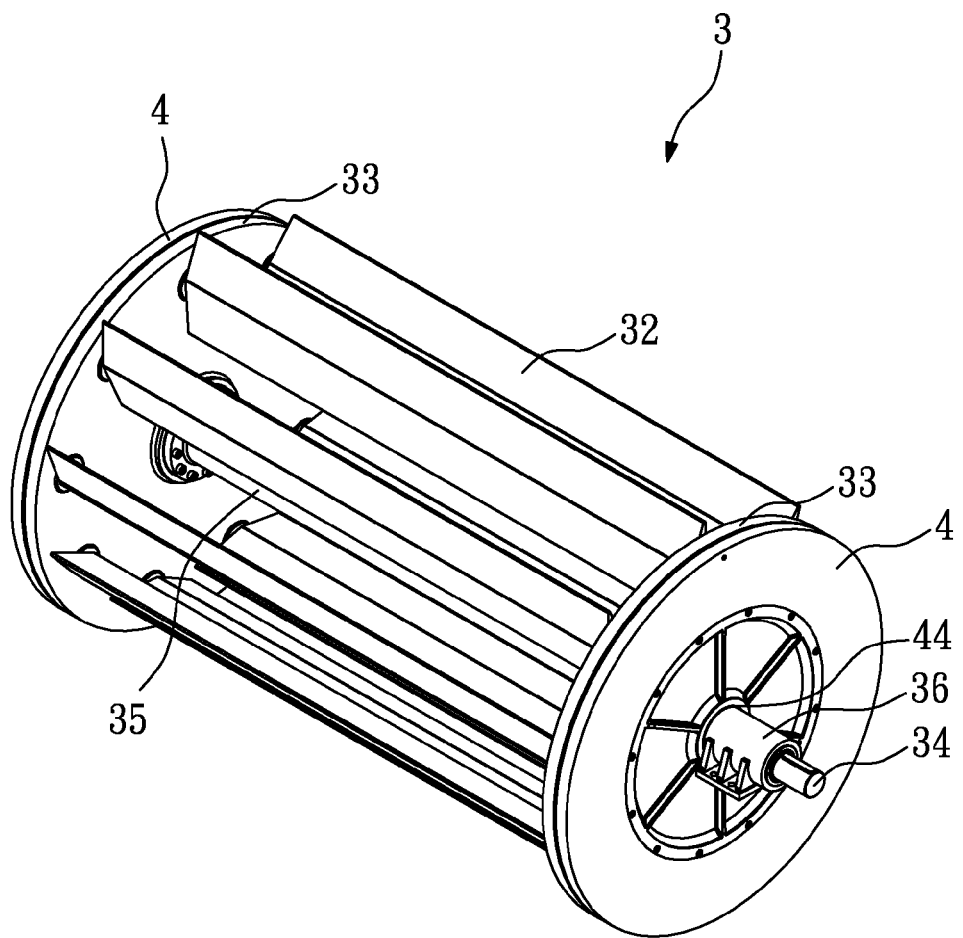
FIG. 7 is a schematic assembly view of the track-type blade set according to a third embodiment of the present invention.

Please refer to FIG. 7 and FIG. 8 together, wherein FIG. 7 is a schematic assembly view of the track-type blade set according to a third embodiment of the present invention, and FIG. 8 is a schematic exploded view of the track-type blade set according to the third embodiment of the present invention. The track-type blade set 3 of this embodiment can be applied to the high efficiency waterwheel apparatus 2 having track-type blades of the first and second embodiments or other type of waterwheel apparatus. The track-type blade set 3 includes at least one track disk 4, a plurality of moving elements 31, a plurality of blades 32, at least one rotating disk 33, a central transmission shaft 34, a central connection shaft 35 and a receiving seat 36. In this embodiment, the quantity of the track disk 4, the rotating disk 33 and the central transmission shaft 34 are two, and they are located on two sides of the blades 32 respectively.

The track disk 4 has at least one track 43 and a central axis, and the track 43 surrounds the central axis. Preferably, the track 43 is fully closed while surrounding the central axis. The moving elements 31 move in the track 43. Two ends of each of the blades 32 connect to the moving element 31 respectively. The rotating disk 33 has a plurality of through holes 331, so that the blade 32 connects to the moving element 31 through the through holes 331. The rotating disk 33 is located between the track disk 4 and the blades 32. The rotating disk 33 rotates relatively to the track disk 4, and the blades 32 rotate when revolving around a central axis of the rotating disk 33.

The central transmission shaft 34 passes through the central hole 332 of the rotating disk 33 and the central hole 44 of the track disk 4, and is fastened and fixed to the center of the rotating disk 33 by a plurality of fastening elements 37, for example, screws, riveting elements or tenons. The central transmission shafts 34 are fixed to the two ends of the central connection shaft 35, and the blades 32 surround the central connection shaft 35. The receiving seat 36 is fixed to a supporting element. Taking the first embodiment for example, when the track-type blade set 3 is disposed in the high efficiency waterwheel apparatus 2 having track-type blades, the receiving seat 36 is fixed to the frame 22 (FIG. 4), and the receiving seat 36 is used to receive the central transmission shaft 34.

Figure 9:
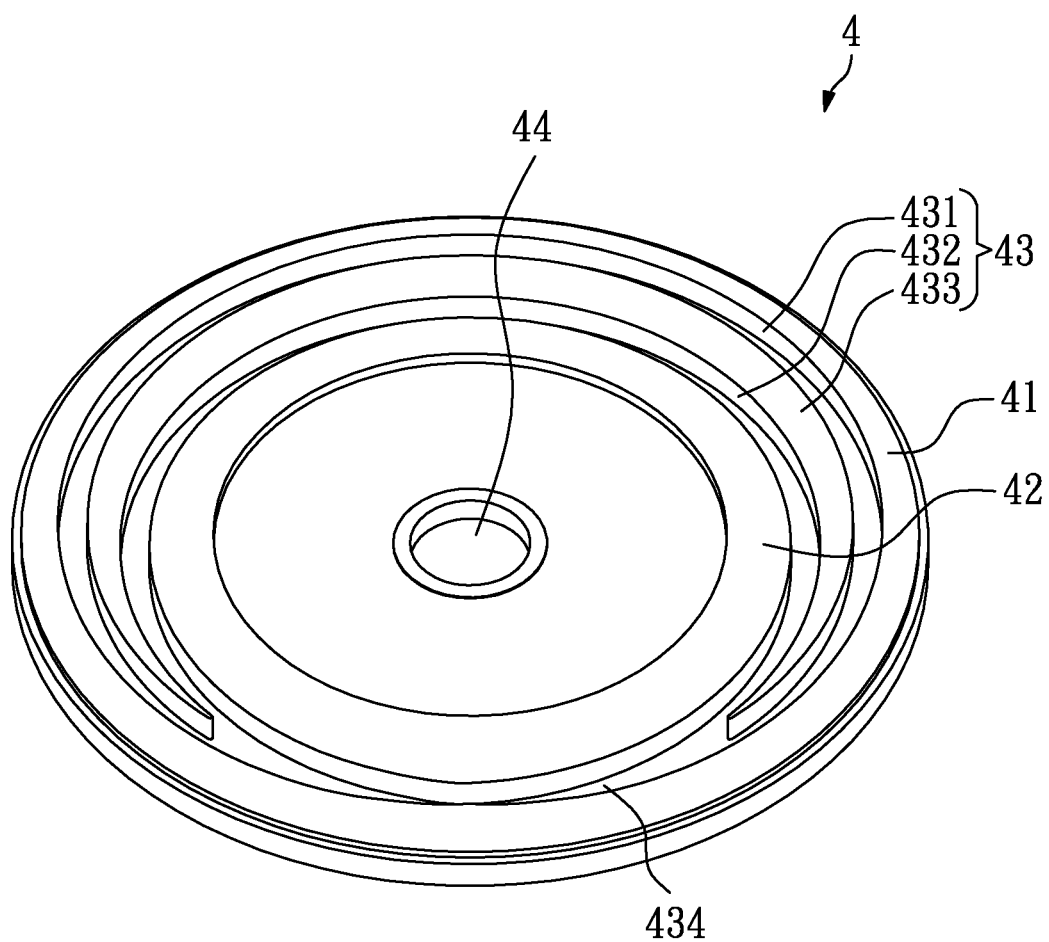
FIG. 9 is a schematic view of a track disk of a track-type blade set according to a third embodiment of the present invention.
Figure 10:
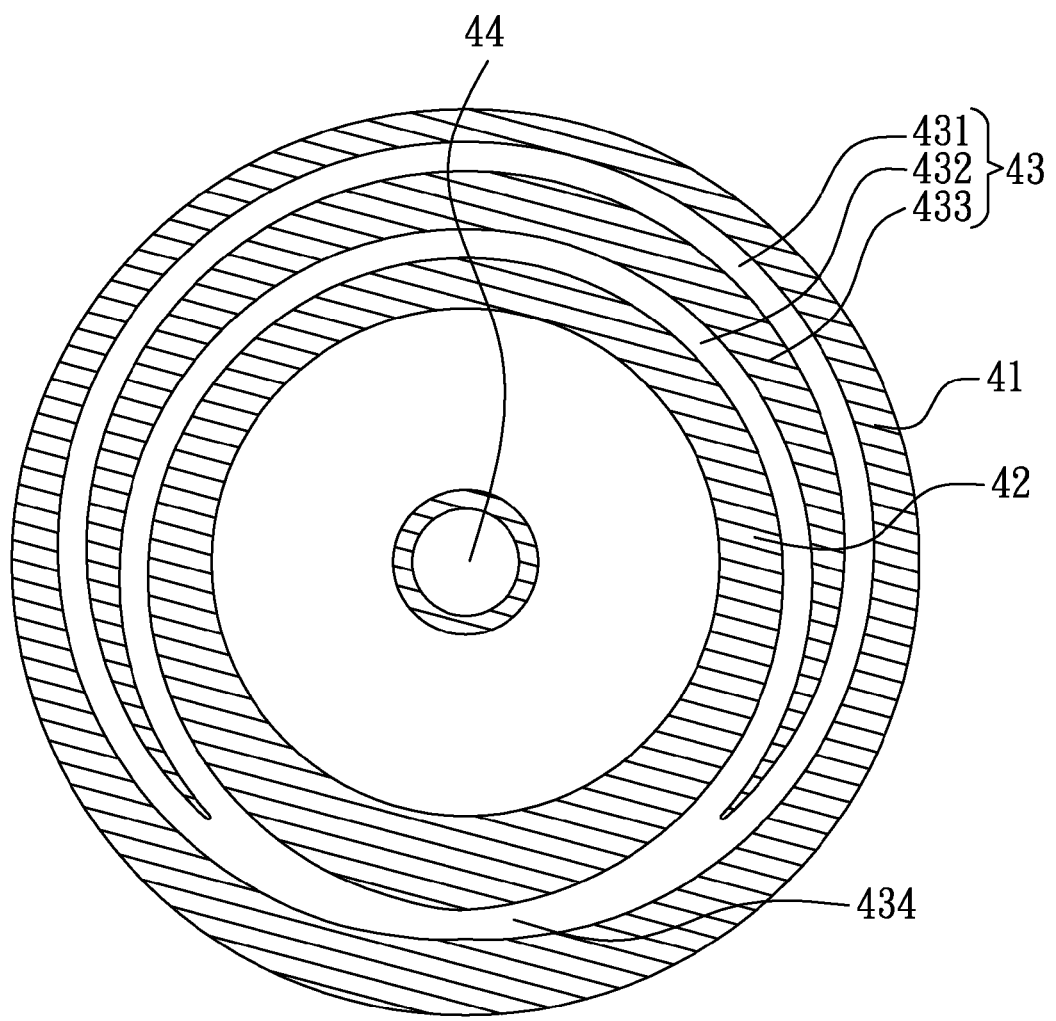
FIG. 10 is a schematic cross-sectional view of the track disk of the track-type blade set according to the third embodiment of the present invention.

Please referring to FIG. 9 and FIG. 10 together, wherein FIG. 9 is a schematic view of a track disk of a track-type blade set according to a third embodiment of the present invention, FIG. 10 is a schematic cross-sectional view of the track disk of the track-type blade set according to the third embodiment of the present invention. The track disk 4 includes a peripheral portion 41, an inner portion 42, and a track 43. The track 43 is located between the peripheral portion 41 and the inner portion 42. The track 43 includes a first track 431, a second track 432, a main spacing portion 433. In this embodiment, the main spacing portion 433 is located between the first track 431 and the second track 432, and the horizontal levels of the bottom surfaces of the first track 431 and the second track 432 are the same and are lower than a top surface of the main spacing portion 433. That is, the first track 431 is a trench between the peripheral portion 41 and the main spacing portion 433, and the second track 432 is a trench between the inner portion 42 and the main spacing portion 433. In this embodiment, the top surfaces of the peripheral portion 41, the inner portion 42 and the main spacing portion 433 are at the same horizontal level.

It should be noted that, the main spacing portion 433 is not fully closed while surrounding a central axis of the track disk 4. That is, the main spacing portion 433 does not surround in a complete circle, but is substantially meniscus-shaped, however, the shape of the main spacing portion 433 is not limited thereto. Therefore, a part of the first track 431 and a part of the second track 432 are overlapped and communicated with each other, as shown in a common area 434.

Figure 11:
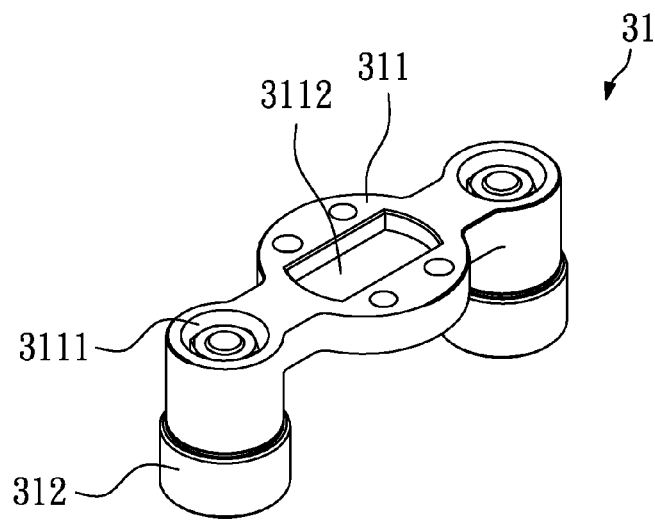
FIG. 11 is a schematic assembly view of the moving element of the track-type blade set according to the third embodiment of the present invention.
Figure 12:
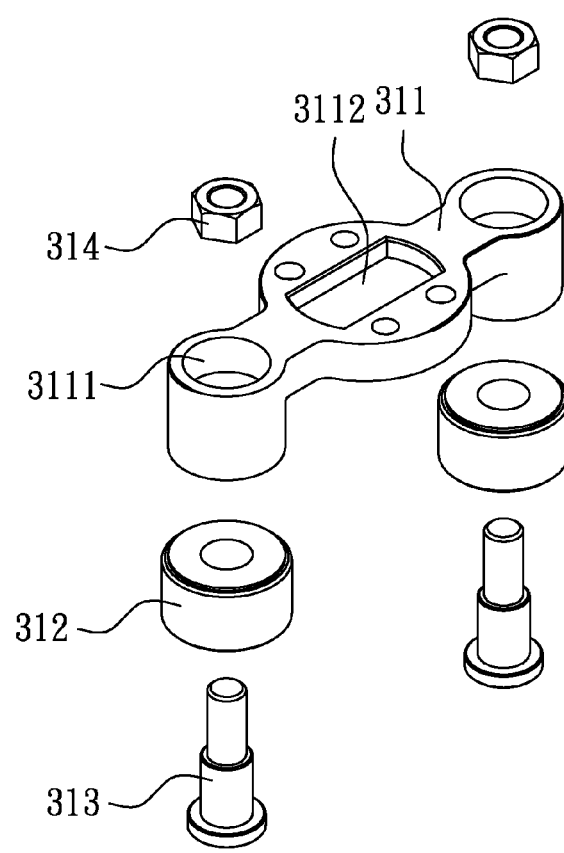
FIG. 12 is a schematic exploded view of the moving element of the track-type blade set according to the third embodiment of the present invention.

Please refer to FIG. 11 and FIG. 12 together, wherein FIG. 11 is a schematic assembly view of the moving element of the track-type blade set according to the third embodiment of the present invention, and FIG. 12 is a schematic exploded view of the moving element of the track-type blade set according to the third embodiment of the present invention. The moving element 31 exemplarily includes a main frame body 311, two guiding elements 312, two pivot pins 313 and two nuts 314. In this embodiment, the main frame body 311 is a straight shape, and has two through holes 3111 and a groove 3112. The through holes 3111 are located on two ends of the main frame body 311 respectively. The groove 3112 is located at a center of the main frame body 311, so that one end of a blade 32 (as shown in FIG. 8) is connected to and is fixedly disposed in the groove 3112.

The guiding element 312 is respectively pivoted on two ends of the main frame body 311. In this embodiment, the guiding element 312 is a hollow cylinder. The pivot pin 313 passes through the guiding element 312 and the through holes 3111, and is then fastened on an end of the pivot pin 313 through the nut 314.

Figure 13:
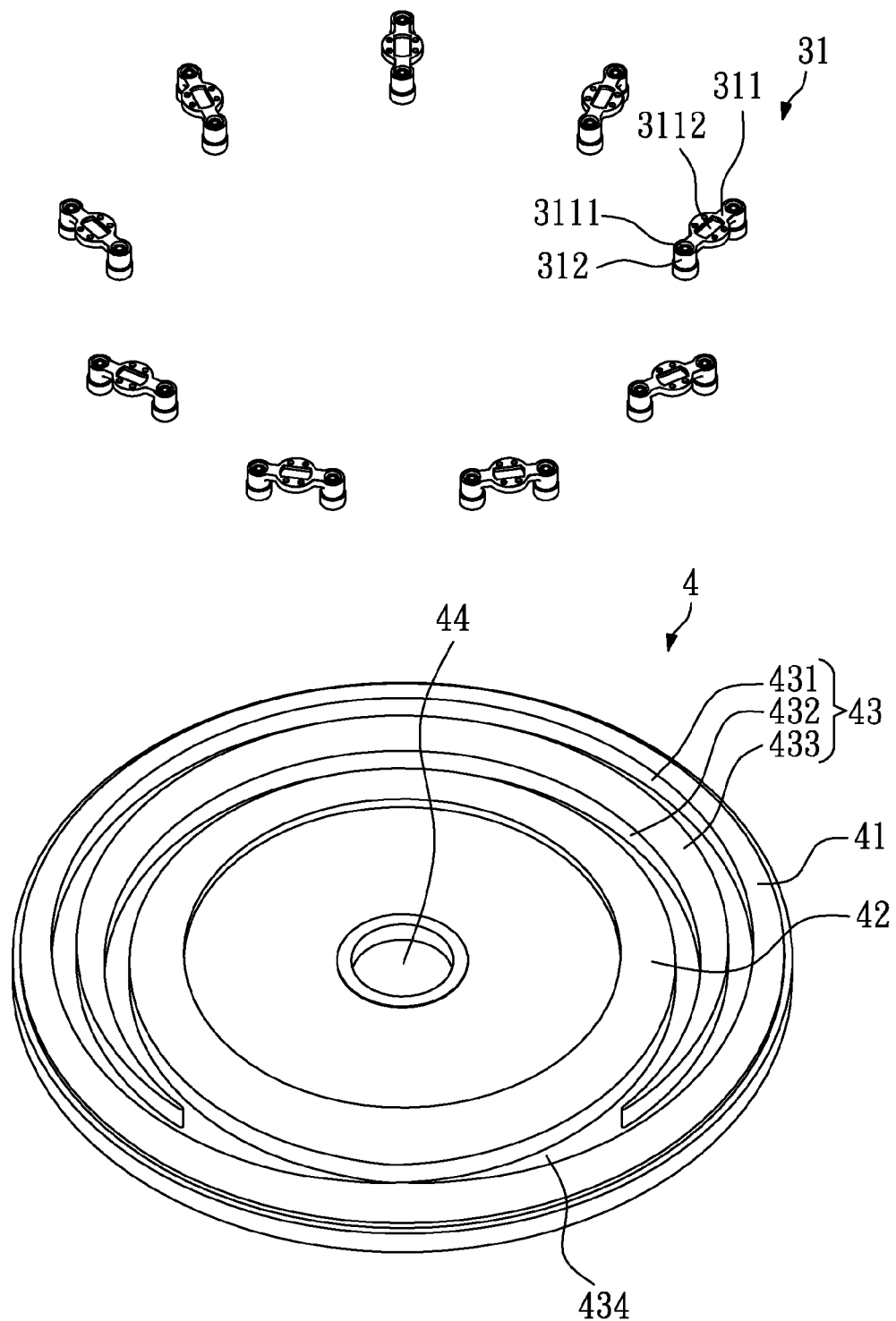
FIG. 13 is a schematic view of the moving element and the track disk in the track-type blade set according to the third embodiment of the present invention.
Figure 14:
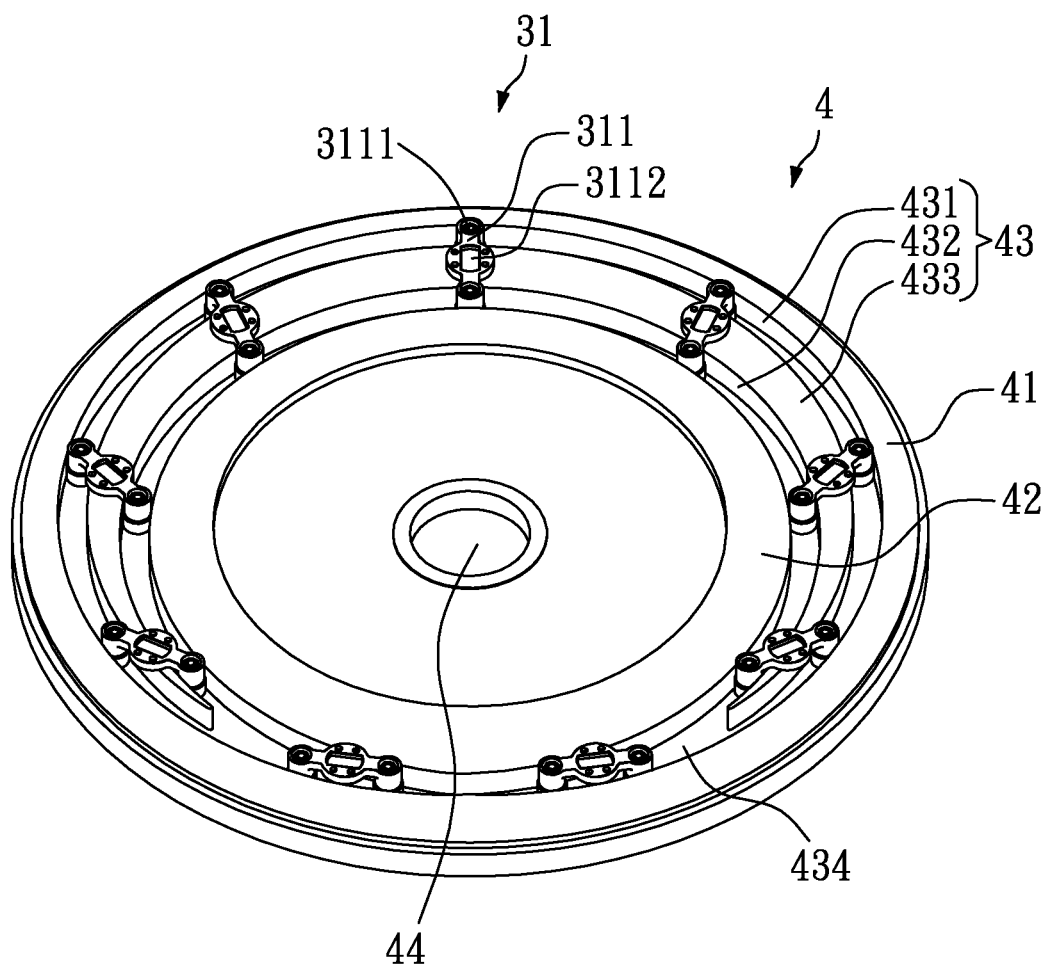
FIG. 14 is a schematic assembly view of the moving element and the track disk in the track-type blade set according to the third embodiment of the present invention.
Figure 15:
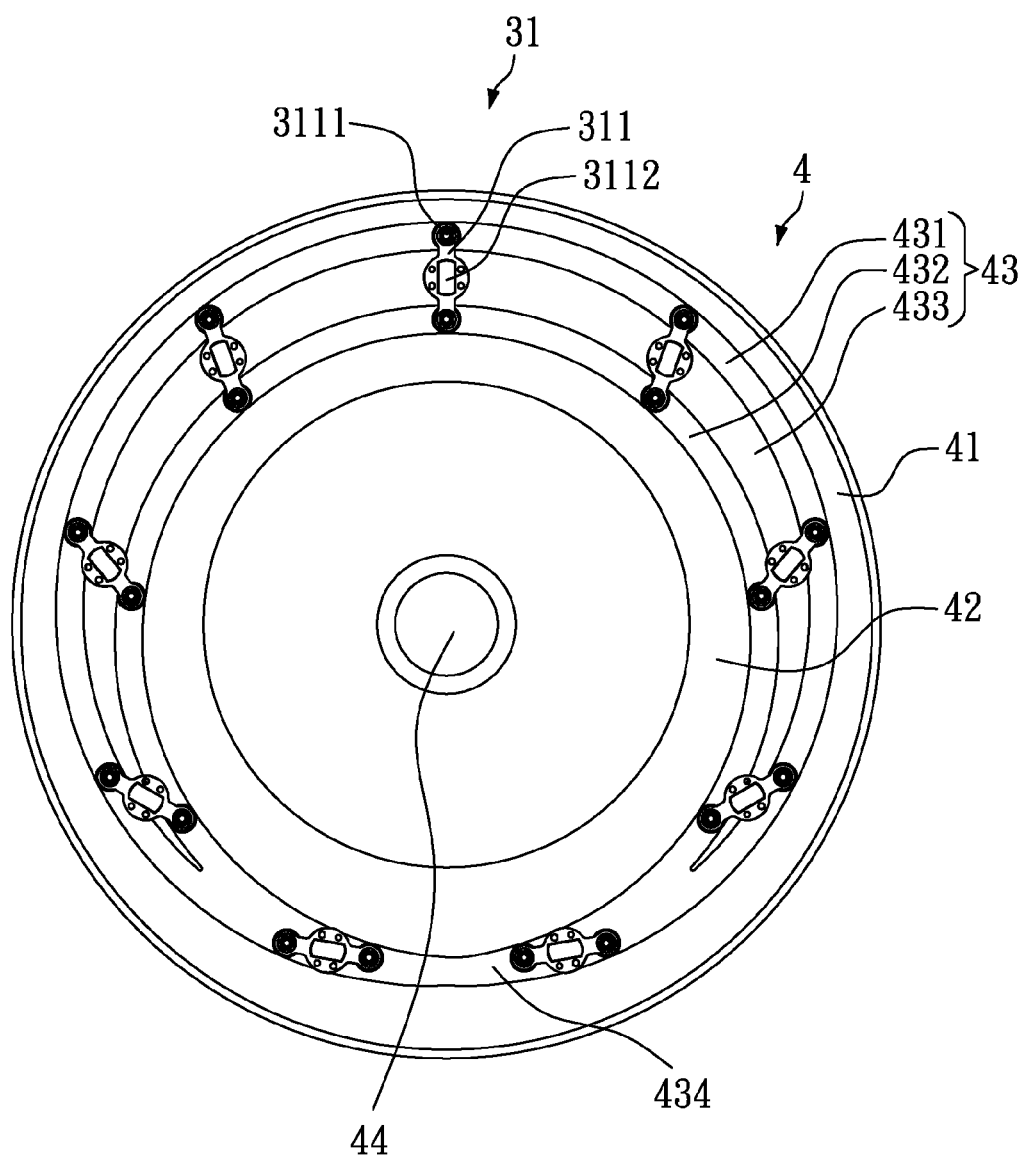
FIG. 15 is a schematic top view of FIG. 14.

Please refer to FIG. 13, FIG. 14, and FIG. 15, wherein FIG. 13 is a schematic view of the moving element and the track disk in the track-type blade set according to the third embodiment of the present invention, FIG. 14 is a schematic assembly view of the moving element and the track disk in the track-type blade set according to the third embodiment of the present invention, and FIG. 15 is a schematic top view of FIG. 14. When the moving element 31 is combined to the track disk 4, the main frame body 311 may cross above the main spacing portion 433, and the guiding element 312 is located in the first track 431 or the second track 432. It should be noted that, the guiding element 312 is preferably not in contact with the bottom surfaces of the first track 431 and the second track 432, but is in contact with side walls of the first track 431 and the second track 432 to form sliding friction. Therefore, the guiding element 312 is made of abrasion resistant material.

Referring to FIG. 15, the moving element 31 moves counterclockwise on the track disk 4. When the moving element 31 is located at the common area 434, the guiding elements 312 are all located in the common area 434, so that the blade 32 connected to the main frame body 311 is substantially parallel to a bottom edge of the track disk 4, for example, the blades 32 are slightly perpendicular to the radial direction of the track disk 4 and are parallel to the water flow direction, thereby reducing the thrust born by the blades 32 in the counterflow area. When the moving element 31 continuously moves to leave the common area 434, due to a special design of the moving element 31, the first track 431, the second track 432 and the main spacing portion 433, the main frame body 311 crosses above the main spacing portion 433, and the guiding elements 312 will respectively enter the first track 431 or the second track 432. While the moving element 31 leaves the common area 434 gradually, the angle of the moving element 31 is changed gradually. When the moving element 31 moves to a top edge of the track disk 4, the main frame body 311 vertically crosses above the main spacing portion 533, so that the blade 32 is perpendicular to a top edge of the track disk 4, for example, the blade 32 is slightly parallel to an radial direction of the track disk 4 and directly faces the water flow direction, so that the blade 32 bear the greatest thrust in the downstream area. Afterwards, the moving element 31 continuously moves counterclockwise to the common area 434, thus finishing the movement in one circle. Thereby, the track-type blade set 3 can fully use the water flow energy with the highest efficiency.

Figure 16:
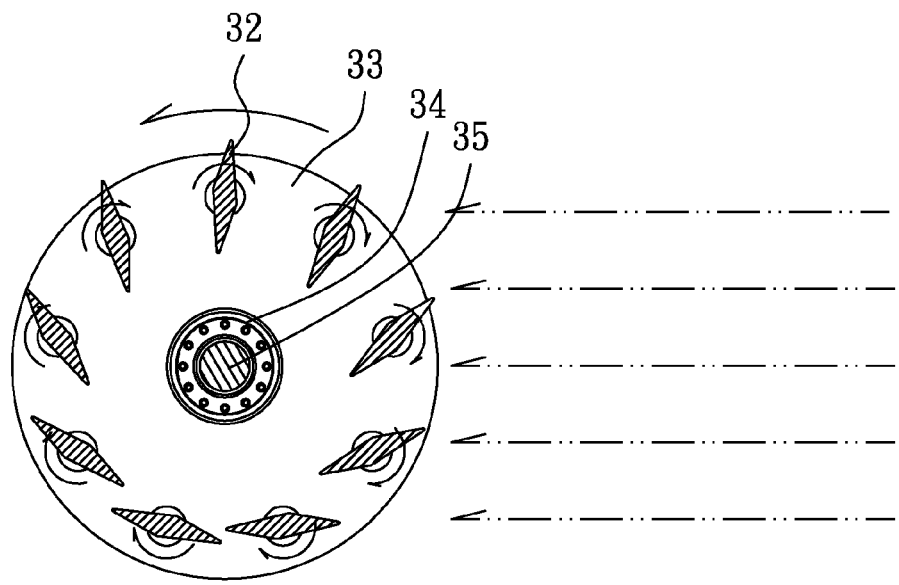
FIG. 16 shows the first operation of the track-type blade set according to the third embodiment of the present invention.
Figure 17:
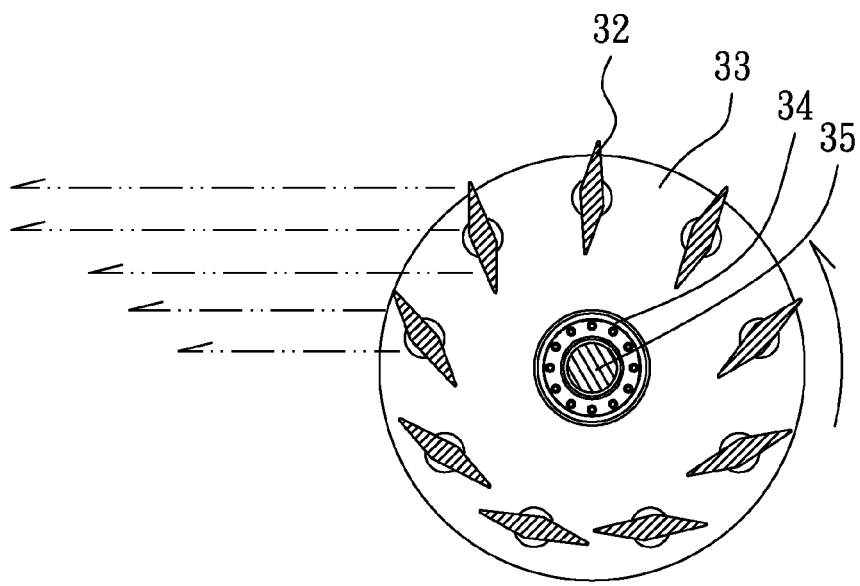
FIG. 17 shows the second operation of the track-type blade set according to the third embodiment of the present invention is shown.
Figure 18:
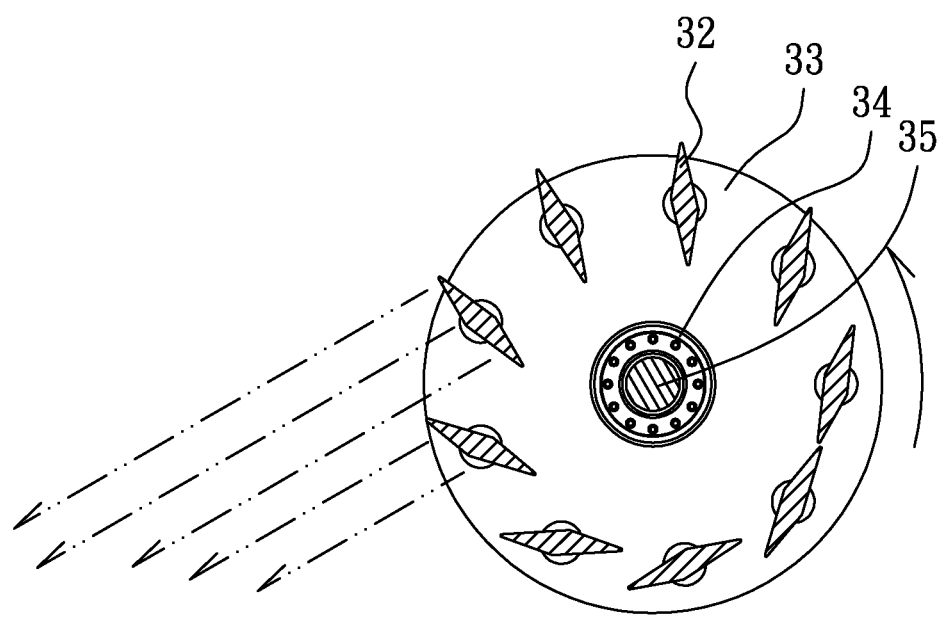
FIG. 18 shows the second operation of the track-type blade set according to the third embodiment of the present invention, wherein the track disk is rotatable.

FIG. 16, FIG. 17 and FIG. 18 show schematic views illustrating the different operations of the track-type blade set of this embodiment when being applied to a high efficiency waterwheel apparatus having track-type blades or other type of waterwheel apparatus. In order to facilitate understanding, the track-type blade set of this embodiment is exemplarily applied to the first embodiment. Referring to FIG. 16, the first operation of the track-type blade set according to the third embodiment of the present invention is shown. In the first case as described above, the power unit is a power generator. The blades 32 of the track-type blade set 3 are pushed by a water flow (the direction is from right to left as shown in the figure), and the rotating disk 33 rotates counterclockwise accordingly, thus driving the central transmission shaft 34 the axle center of the power unit to rotate and generate power.

Referring to FIG. 17, the second operation of the track-type blade set according to the third embodiment of the present invention is shown. In the second case as described above, the power unit is a power source (for example, an electric motor). The power source is used to drive the rotating disk 33 through the central transmission shaft 34, so that the blades 32 of the track-type blade set 3 are forced to rotate accordingly, thus producing a water flow that flows toward the left of the figure. It is understood that the direction of the water flow can be changed by rotating the track disk 4, as shown in FIG. 18. Therefore, when the track-type blade set 3 is applied to a ship, it can produce thrust force in any direction, thus, the ship can have excellent steering and positioning performance.

Figure 19:
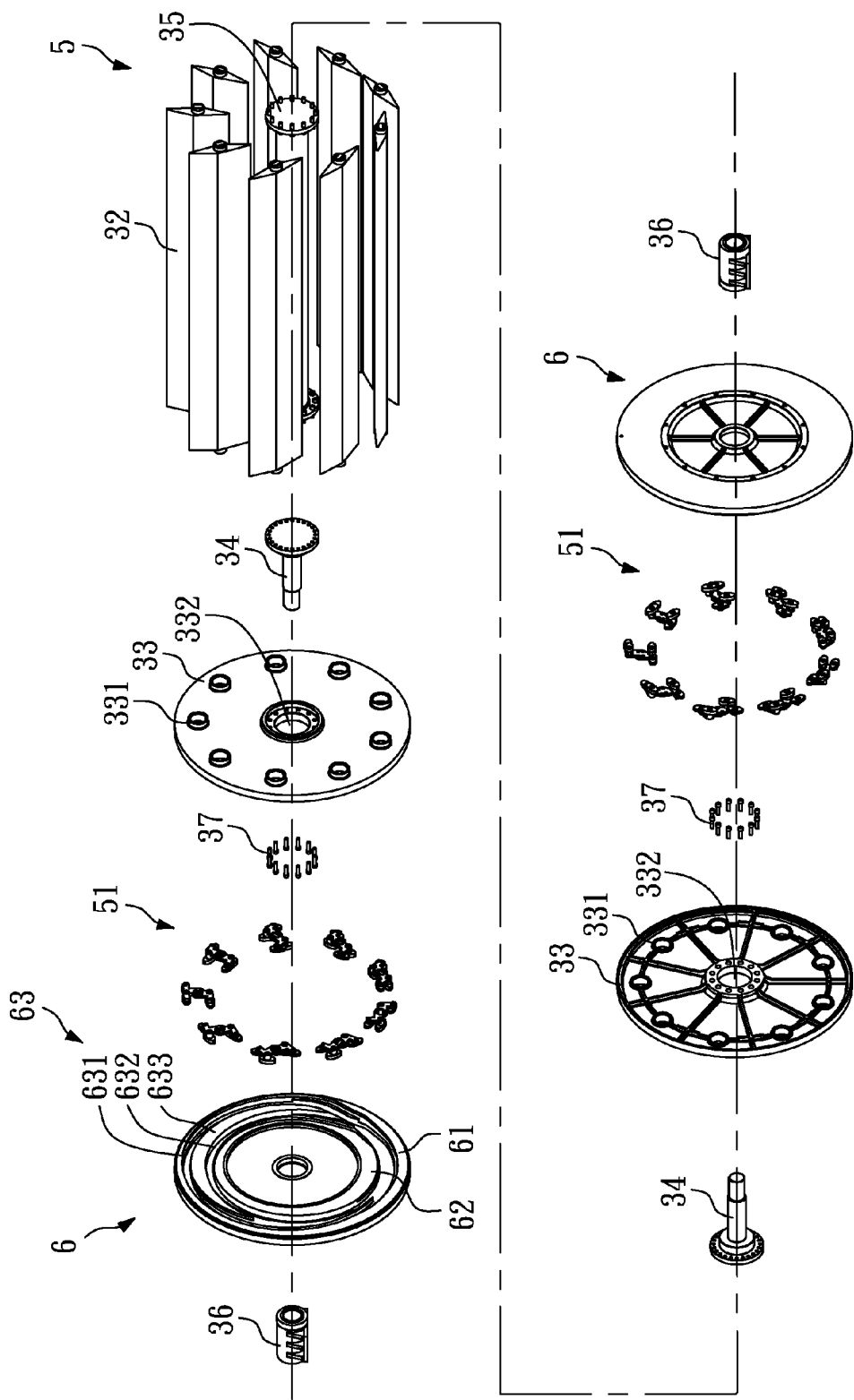
FIG. 19 is a schematic assembly view of the track-type blade set according to a fourth embodiment of the present invention.

FIG. 19 is a schematic assembly view of the track-type blade set according to a fourth embodiment of the present invention. The track-type blade set 5 of this embodiment is substantially the same as the track-type blade set 3 of the third embodiment (FIG. 7), and the same elements are designated with the same reference numerals. The difference between the track-type blade set 5 of this embodiment and track-type blade set 3 of the third embodiment lies in that the track disk 6 and the moving elements 51 of this embodiment is different from that of the third embodiment.

Figure 20:
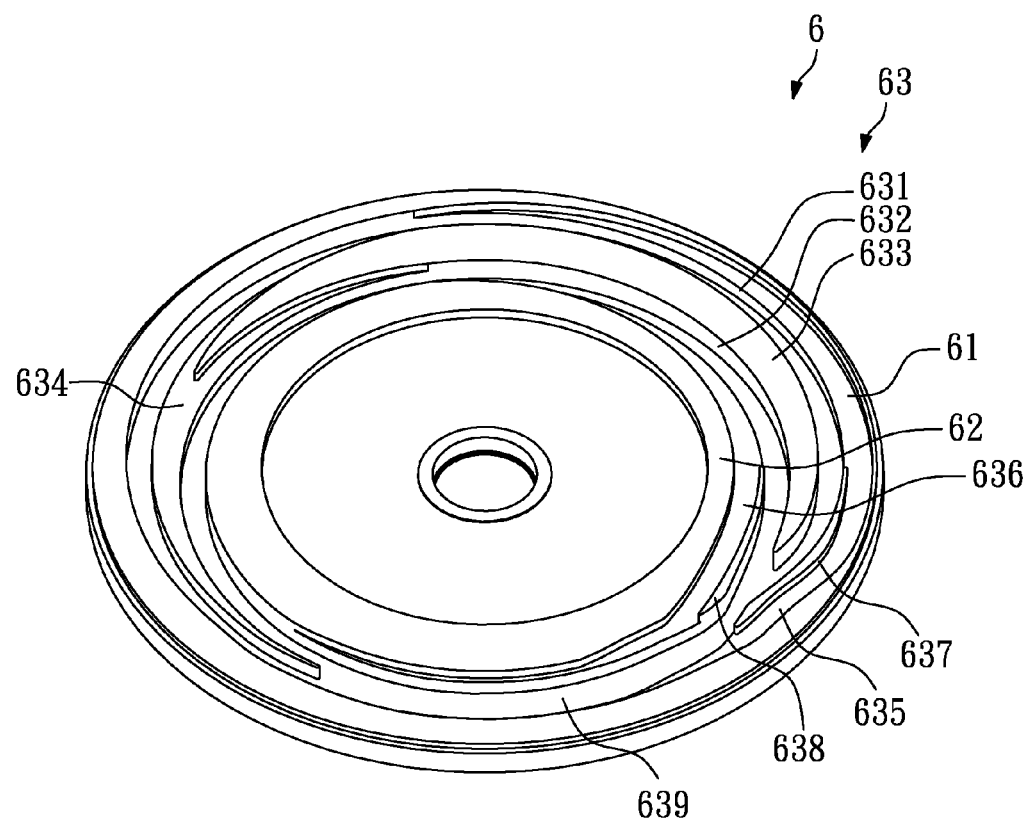
FIG. 20 is a schematic view of a track disk of a track-type blade set according to a fourth embodiment of the present invention.
Figure 21:
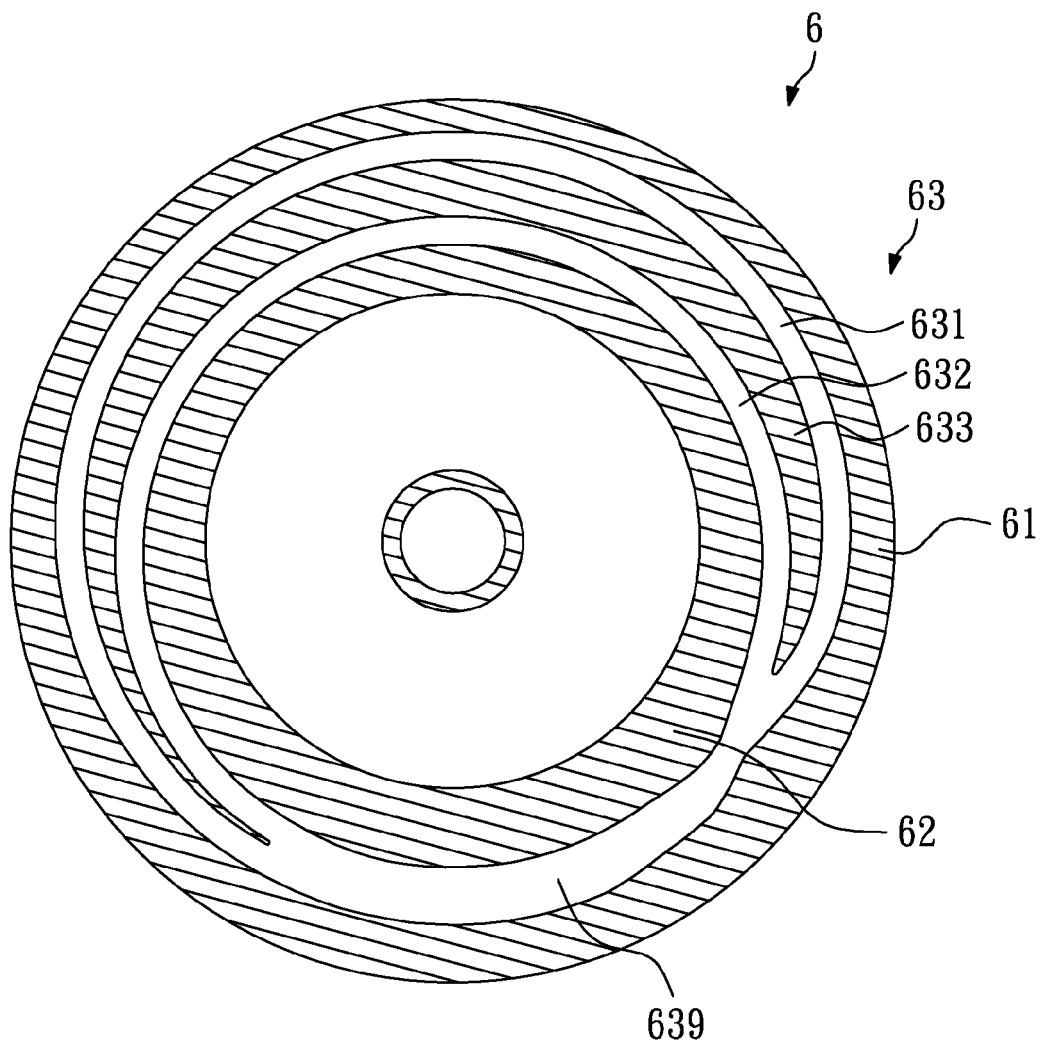
FIG. 21 is a schematic cross-sectional view of the track disk of the track-type blade set in a horizontal direction at a first level according to the fourth embodiment of the present invention.
Figure 22:
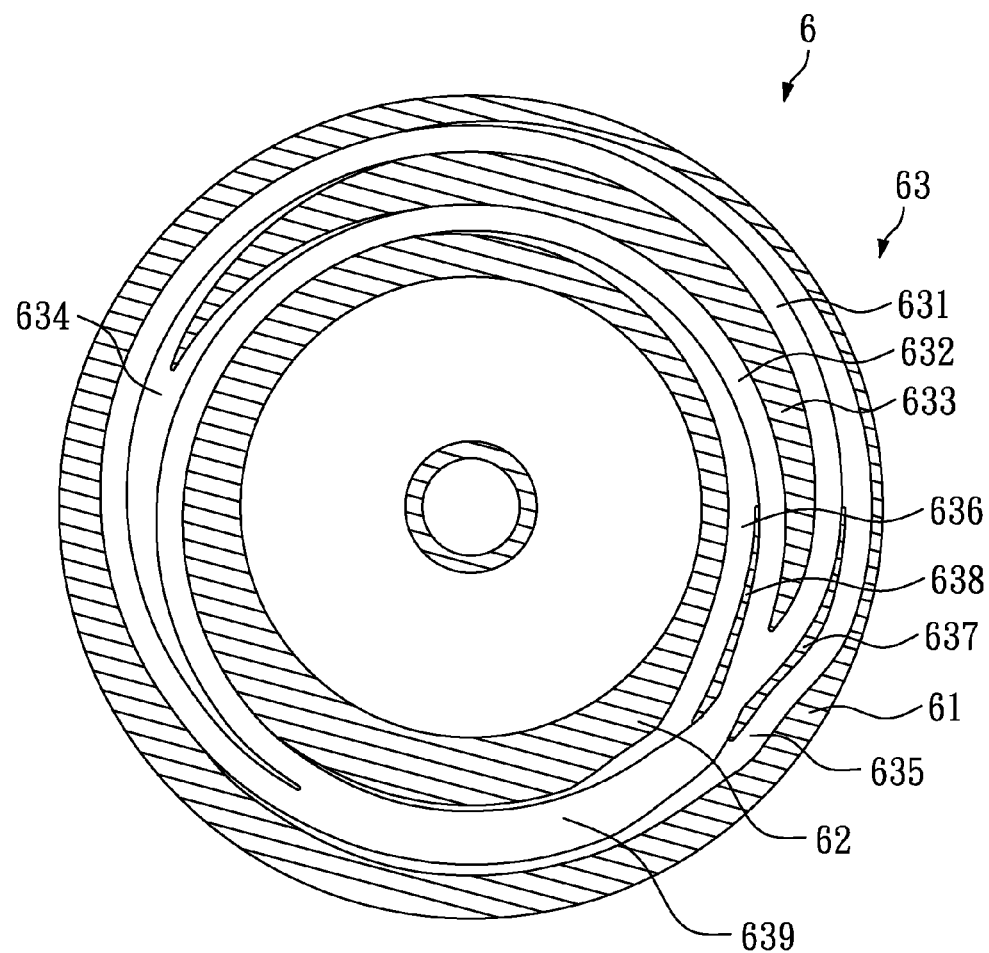
FIG. 22 is a schematic cross-sectional view of the track disk of the track-type blade set in the horizontal direction at a second level according to the fourth embodiment of the present invention.

Please referring to FIG. 20, FIG. 21 and FIG. 22 together, wherein FIG. 20 is a schematic view of a track disk of a track-type blade set according to a fourth embodiment of the present invention, FIG. 21 is a schematic cross-sectional view of the track disk of the track-type blade set in a horizontal direction at a first level according to the fourth embodiment of the present invention, and FIG. 22 is a schematic cross-sectional view of the track disk of the track-type blade set in the horizontal direction at a second level according to the fourth embodiment of the present invention, in which the second level is higher than the first level.

The track disk 6 of this embodiment includes a peripheral portion 61, an inner portion 62 and a track 63. The track 63 is located between the peripheral portion 61 and the inner portion 62. The track 63 includes a first track 631, a second track 632, a main spacing portion 633, a first auxiliary track 634, a second auxiliary track 635, a third auxiliary track 636, a first secondary spacing portion 637 and a second secondary spacing portion 638.

The main spacing portion 633 is located between the first track 631 and the second track 632, and the horizontal levels of the bottom surfaces of the first track 631 and the second track 632 are the same and are lower than a top surface of the main spacing portion 633. That is, in this embodiment, the first track 631 is a trench between the peripheral portion 61 and the main spacing portion 633, and the second track 632 is a trench between the inner portion 62 and the main spacing portion 633. In this embodiment, the top surfaces of the peripheral portion 61, the inner portion 62, and the main spacing portion 633 are at the same horizontal level. It should be noted that, the main spacing portion 633 is not fully closed while surrounding a central axis of the track disk 6. That is, the main spacing portion 633 does not surround in a complete circle, but is substantially meniscus-shaped. Therefore, a part of the first track 631 and a part of the second track 632 are overlapped and communicated with each other, as shown in a common area 639.

However, the level and location relation among the first track 631, the second track 632 and the main spacing portion 633 is not limited thereto, but may have different designs according to a connection way between the track 63 and a moving element 51. For example, when the moving element 51 slides into the track 63 from one side, the first track 631 and the second track 632 may also be respectively disposed on side surfaces of the peripheral portion 61 and the inner portion 62 and the main spacing portion 633 is a trench at this time. By adjusting the main spacing portion 633 to have different widths on different angles, a part of the first track 631 and a part of the second track 632 are close to each other, and other parts of the first track 631 and the second track 632 are far away from each other.

In this embodiment, the first auxiliary track 634 is located on a part of the main spacing portion 633, the second auxiliary track 635 is located on a part of the peripheral portion 61, and the third auxiliary track 636 is located on a part of the inner portion 62. The first auxiliary track 634, the second auxiliary track 635 and the third auxiliary track 636 are not continuous with each other. The bottom surfaces of the first auxiliary track 634, the second auxiliary track 635 and the third auxiliary track 636 are lower than the top surfaces of the peripheral portion 61, the inner portion 62 and the main spacing portion 633, but are higher than the bottom surfaces of the first track 631 and the second track 632. The first secondary spacing portion 637 is located between the first track 631 and the second auxiliary track 635, and the second secondary spacing portion 638 is located between the second track 632 and the third auxiliary track 636. A part of the common area 639 is located between a part of the first secondary spacing portion 637 and a part of the second secondary spacing portion 638. In this embodiment, the top surfaces of the main spacing portion 633, the first secondary spacing portion 637 and the second secondary spacing portion 638 are at the same horizontal level.

Figure 23:
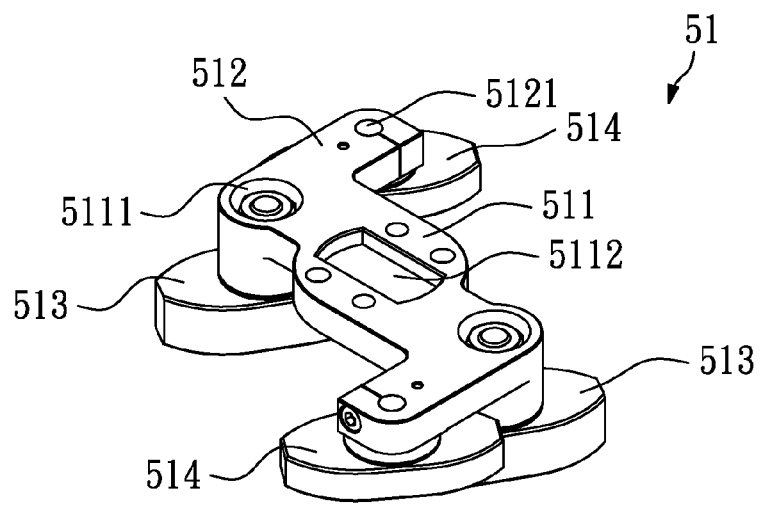
FIG. 23 is a schematic assembly view of the moving element of the track-type blade set according to the fourth embodiment of the present invention.
Figure 24:
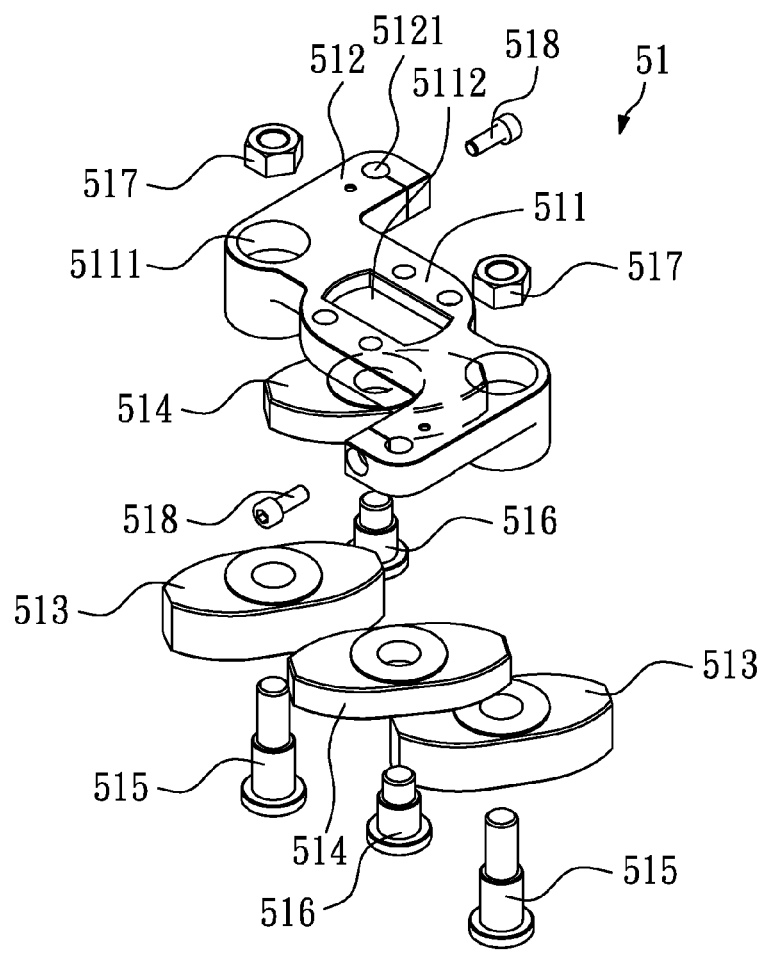
FIG. 24 is a schematic exploded view of the moving element of the track-type blade set according to the fourth embodiment of the present invention.

Please refer to FIG. 23 and FIG. 24 together, wherein FIG. 23 is a schematic assembly view of the moving element of the track-type blade set according to the fourth embodiment of the present invention, and FIG. 24 is a schematic exploded view of the moving element of the track-type blade set according to the fourth embodiment of the present invention. In this embodiment, the moving element 51 exemplarily includes a main frame body 511, two extending portions 512, two main guiding elements 513, two secondary guiding elements 514, two main pivot pins 515, two secondary pivot pins 516, two nuts 517 and two screws 518. The extending portion 512 extends from two ends of the main frame body 511 to form a Z-like shape. In other embodiments, a part of the elements may be omitted or replaced by other elements, for example, other fastening elements may be used to replace the nuts 517 and the screws 518.

The main frame body 511 has two through holes 5111 and one groove 5112. The through holes 5111 are located on two ends of the main frame body 511 respectively. The groove 5112 is located at a center of the main frame body 511, so that one end of a blade 32 (as shown in FIG. 19) is connected to and is fixedly disposed in the groove 5112. Each extending portion 512 has a through hole 5121.

The main guiding element 513 is respectively pivoted on two ends of the main frame body 511. The secondary guiding element 514 is respectively pivoted on one end of each extending portion 512. In this embodiment, the main guiding element 513 and the secondary guiding element 514 are hollow and in an elliptic cylinder-like shape, but are not limited thereto. The main pivot pin 515 passes through the main guiding element 513 and the through holes 5111, and is then fastened on an end of the main pivot pin 515 through the nut 517. The secondary pivot pin 516 passes through the secondary guiding element 514 and the through hole 5121, and is then fastened on an end of the extending portion 512 through the screw 518. As shown in FIG. 23, in the moving element 51 after assembly, the bottom surface of the secondary guiding element 514 is higher than the top surface of the main guiding element 513.

Figure 25:
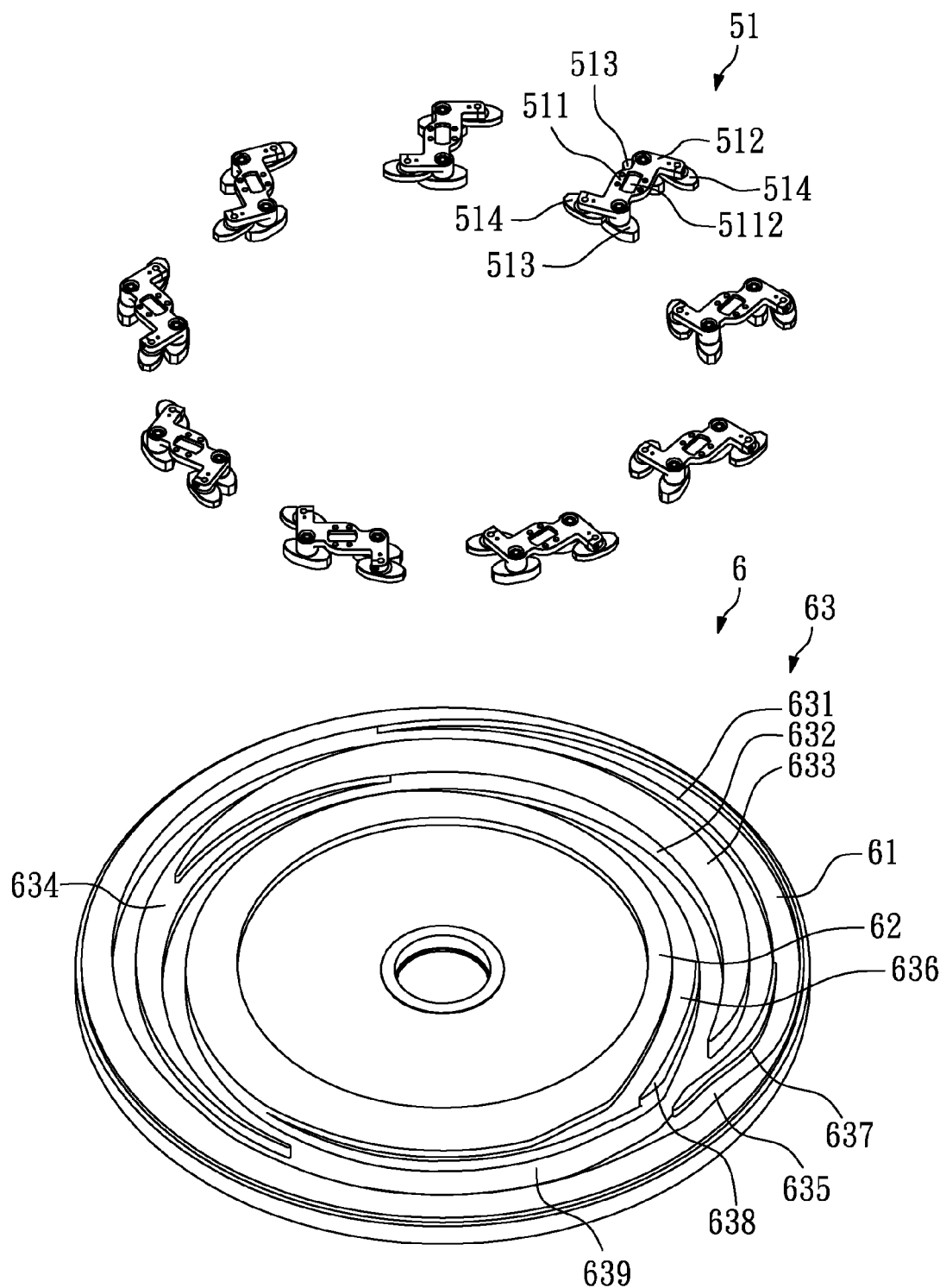
FIG. 25 is a schematic view of the moving element and the track disk of the track-type blade set according to the fourth embodiment of the present invention.
Figure 26:
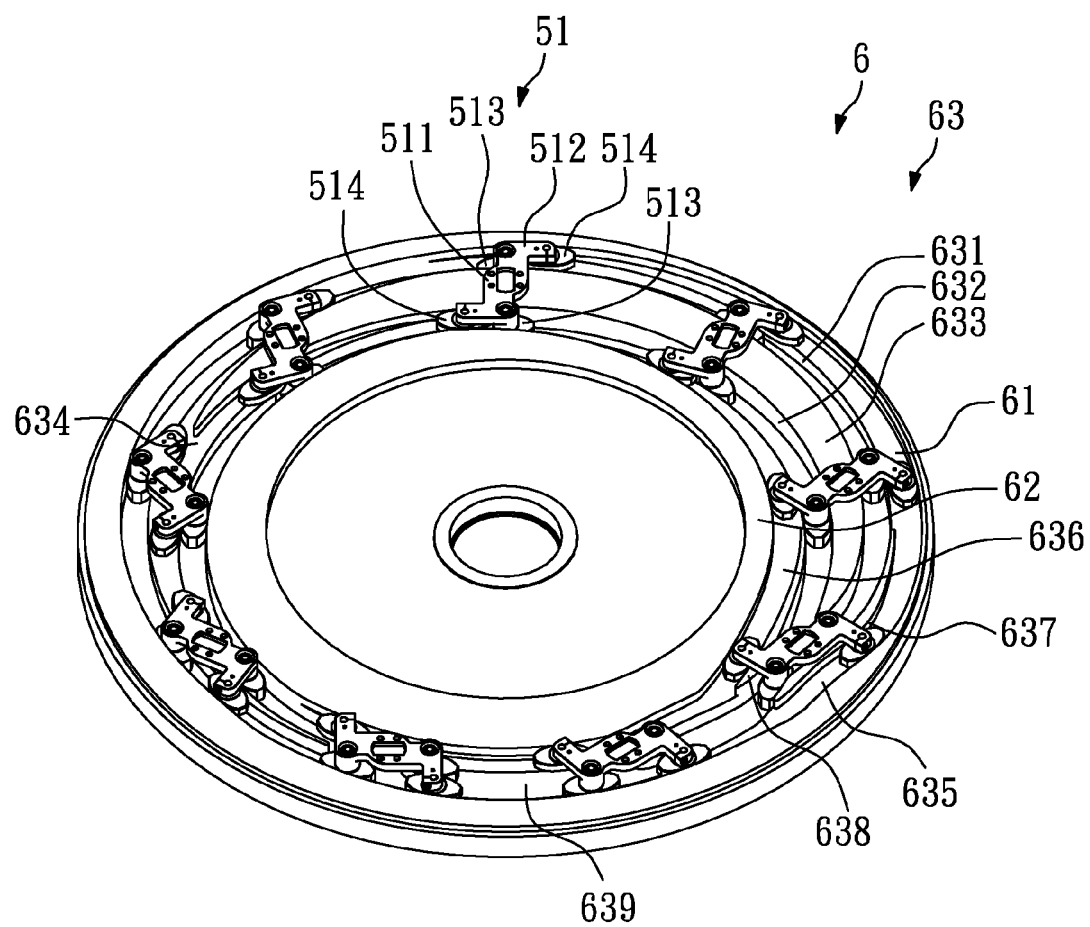
FIG. 26 is a schematic assembly view of the moving element and the track disk of the track-type blade set according to the fourth embodiment of the present invention.
Figure 27:
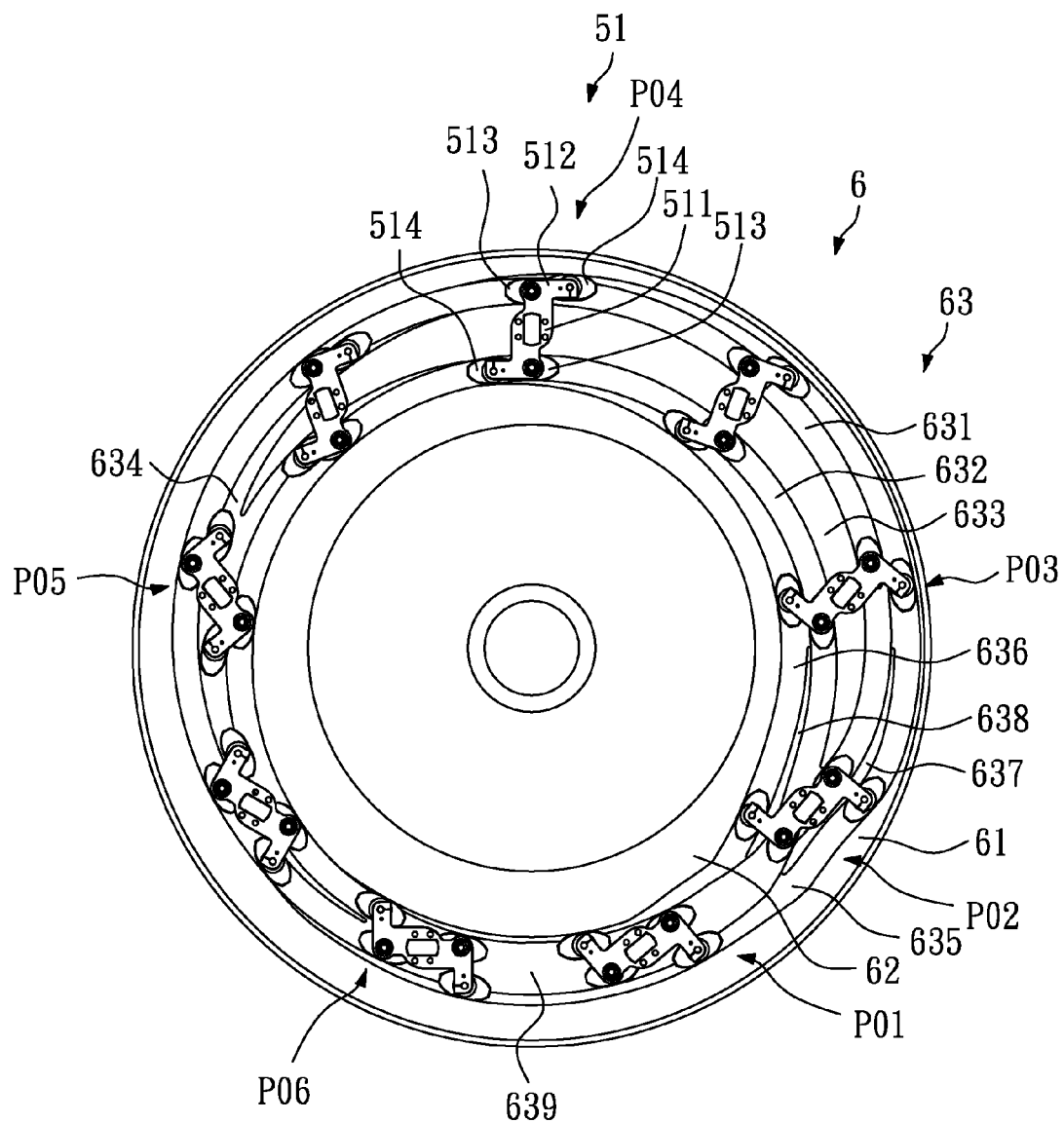
FIG. 27 is a schematic top view of FIG. 26.

Please refer to FIG. 25, FIG. 26 and FIG. 27, wherein FIG. 25 is a schematic view of the moving element and the track disk of the track-type blade set according to the fourth embodiment of the present invention, FIG. 26 is a schematic assembly view of the moving element and the track disk of the track-type blade set according to the fourth embodiment of the present invention, and FIG. 27 is a schematic top view of FIG. 26. When the moving element 51 is combined to the track disk 6, the main frame body 511 may cross above the main spacing portion 633, and the extending portion 512 may cross above the first secondary spacing portion 637 and the second secondary spacing portion 638. The main guiding element 513 is located in the first track 631 or the second track 632. The secondary guiding element 514 may be located in the first auxiliary track 634, the second auxiliary track 635 and the third auxiliary track 636. Since the horizontal levels are different, the main guiding element 513 does not enter the first auxiliary track 634, the second auxiliary track 635, and the third auxiliary track 636, while the secondary guiding element 514 will enter the first track 631 or the second track 632.

It should be noted that, the main guiding element 513 is preferably not in contact with the bottom surfaces of the first track 631 and the second track 632, but is in contact with side walls of the first track 631 and the second track 632 to form sliding friction. The secondary guiding element 514 is preferably not in contact with the bottom surfaces of the first track 631, the second track 632, the first auxiliary track 634, the second auxiliary track 635 and the third auxiliary track 636, but is in contact with the side walls of the first track 631, the second track 632, the first auxiliary track 634, the second auxiliary track 635 and the third auxiliary track 636 to form sliding friction. Therefore, the main guiding element 513 and the secondary guiding element 514 are both made of abrasion resistant materials.

In this embodiment, the moving element 51 moves counterclockwise on the track disk 6. As shown in FIG. 27, when the moving element 51 is located at a first position P01 which is the common area 639, the main guiding elements 513 are all located in the common area 639 at this time, and the secondary guiding elements 514 are respectively located on the second auxiliary track 635 and the third auxiliary track 636. When the moving element 51 continuously moves to a second position P02, due to a special design of the moving element 51 and the track of the track disk 6, the extending portion 512 crosses above the first secondary spacing portion 637 and the second secondary spacing portion 638, and the main guiding elements 513 are ready to respectively enter the first track 631 and the second track 632 at this time.

When the moving element 51 continuously moves to a third position P03, the main frame body 511 crosses above the main spacing portion 633, and the moving element 51 already leaves the first secondary spacing portion 637 and the second secondary spacing portion 638 at this time. The main guiding elements 513 are respectively located in the first track 631 and the second track 632, and the secondary guiding elements 514 are respectively located in the second auxiliary track 635 and the third auxiliary track 636. When the moving element 51 continuously moves to a fourth position P04, the secondary guiding element 514 leaves the second auxiliary track 635 and the third auxiliary track 636 at this time, and therefore, the main guiding element 513 and the secondary guiding element 514 are respectively located in the first track 631 and the second track 632. At this time, the main frame body 511 vertically crosses above the main spacing portion 633, so that the blade 32 connected to the main frame body 511 is perpendicular to a top edge of the track disk 6, for example, the blade 32 is slightly parallel to an radial direction of the track disk 6 and directly faces the water flow direction, so that the blade 32 bear the greatest thrust in the downstream area.

When the moving element 51 continuously moves to a fifth position P05, the moving element 51 has already left the main spacing portion 633 at this time, and the secondary guiding elements 514 all enter the first auxiliary track 634, but are not in contact with any side wall. The main guiding elements 513 are still respectively located in the first track 631 and the second track 632.

When the moving element 51 continuously moves to a sixth position P06, the moving element 51 has left the first auxiliary track 634 at this time, and the secondary guiding elements 514 are ready to enter the second auxiliary track 635 and the third auxiliary track 636, and are in contact with the side walls. The main guiding elements 513 enter the common area 639, so that the blades 32 (as shown in FIG. 19) connected to the main guiding elements 513 are parallel to a bottom edge of the track disk 6, for example, the blades 32 are slightly perpendicular to the radial direction of the track disk 6 and are parallel to the water flow direction, thereby reducing the thrust born by the blades 32 in the counterflow area.

Afterwards, the moving element 51 continuously moves counterclockwise to the common area 639, thus finishing the movement in one circle. Therefore, through the elaborate design of the track 63 of the track disk 6, the blades 32 (as shown in FIG. 19) also rotate during a revolution process. As a result, when the blades 32 revolve to different positions, the blades 32 also rotate to different angles, and varied angle differences occur between every two blades 32, so that the blade 32 in the downstream area faces the water flow with the largest area, and the blade 32 in the counterflow area is parallel to the water flow, thereby reducing the thrust and fully using the water flow energy with the highest efficiency.

Figure 28:
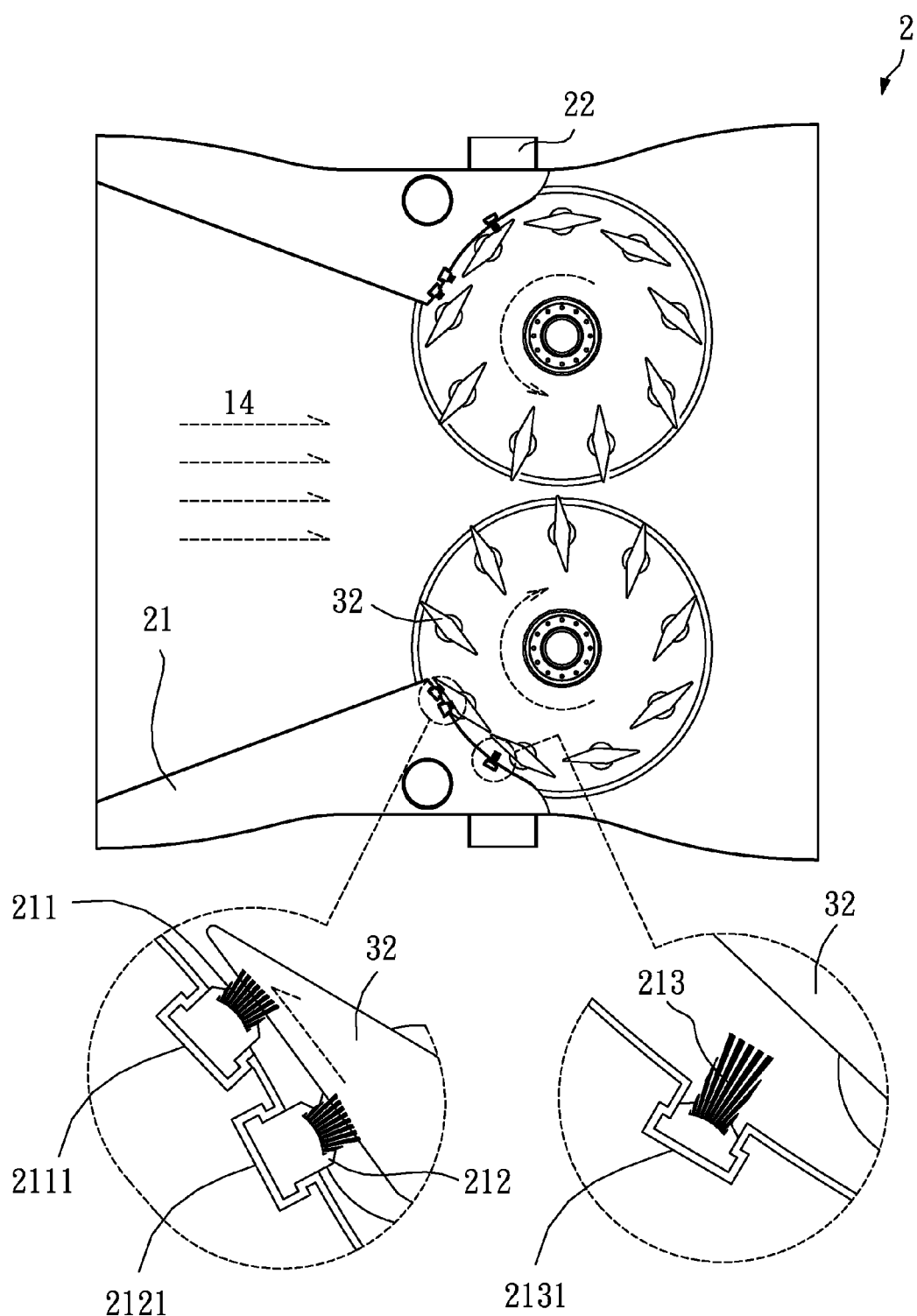
FIG. 28 shows a schematic view illustrating the first operation of a decontamination brush of the high efficiency waterwheel apparatus having track-type blades according to the fifth embodiment of the present invention.
Figure 29:
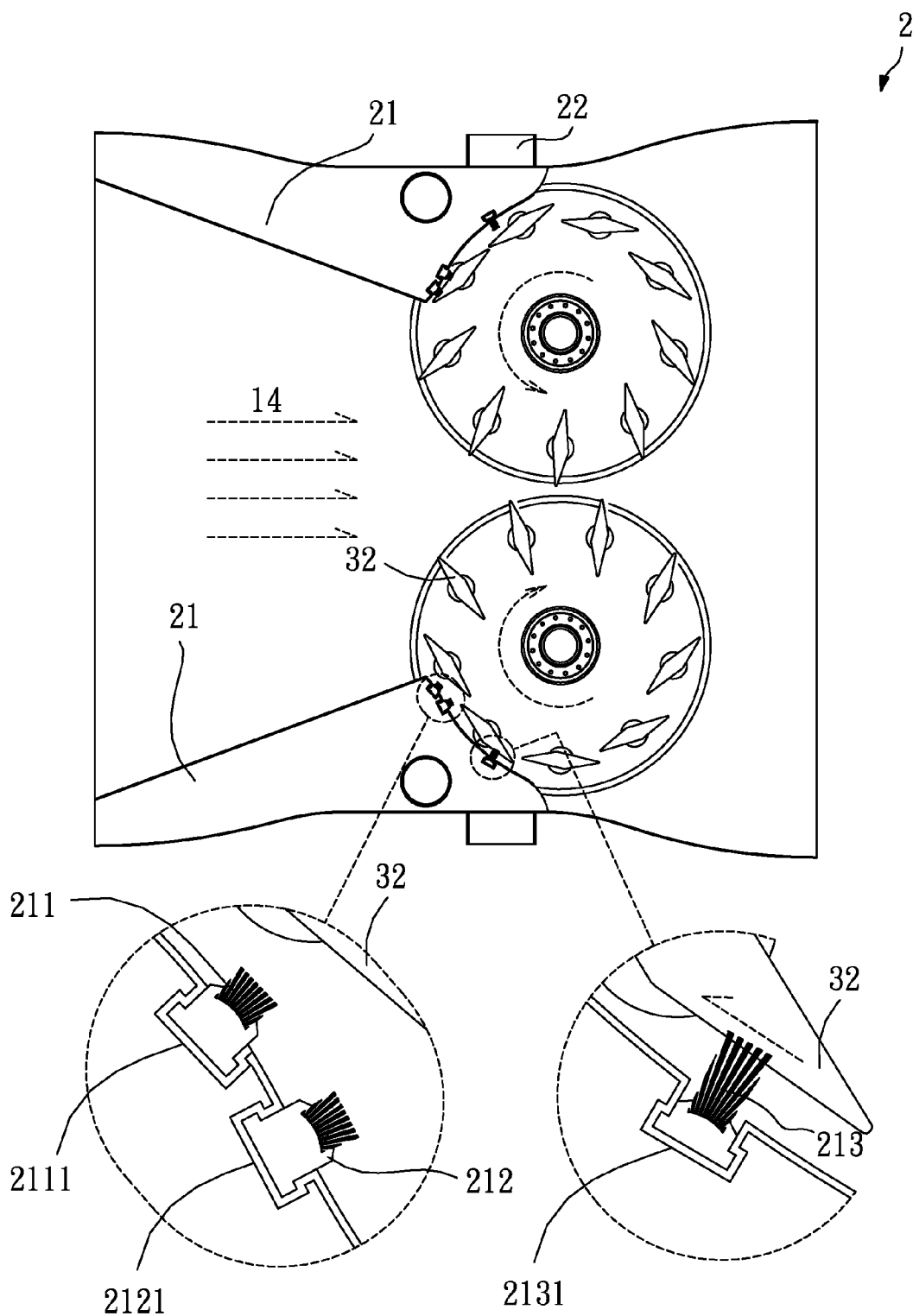
FIG. 29 shows a schematic view illustrating the second operation of a decontamination brush of the high efficiency waterwheel apparatus having track-type blades according to the fifth embodiment of the present invention.

Please refer to FIG. 28 and FIG. 29, wherein FIG. 28 shows a schematic view illustrating the first operation of a decontamination brush of the high efficiency waterwheel apparatus having track-type blades according to the fifth embodiment of the present invention, and FIG. 29 shows a schematic view illustrating the second operation of a decontamination brush of the high efficiency waterwheel apparatus having track-type blades according to the fifth embodiment of the present invention. In order to facilitate understanding, the waterwheel apparatus 2 is exemplarily to be the second embodiment, which has two track-type blades and a collector mask 21 supported by the frame 22. However, in this embodiment, there are a first decontamination brush 211, a second decontamination brush 212 and a third decontamination brush 213 disposed on the end of the collector mask 21 where is near the blade 32. The first decontamination brush 211, the second decontamination brush 212 and the third decontamination brush 213 are disposed in the recesses 2111, 2121, 2131. However, it is understood that the quantity and the position of the decontamination brush can changed according to the requirement or other factor, and are not limited thereto.

When the blades 32 are driven by the water flow 14, a front portion of a blade 32 is in contact with the first decontamination brush 211 and the second decontamination brush 212, so as to brush off the marine organism accretion on the front portion of the blade 32. Meanwhile, the third decontamination brush 213 is not in contact with any blade 32. However, when the blade 32 rotates continuously, a back portion of the next blade 32 is only in contact with the third decontamination brush 213, so as to brush off the marine organism accretion on the back portion of the next blade 32. Meanwhile, the first decontamination brush 211 and the second decontamination brush 212 are not in contact with any blade 32. As a result, the sequence for removing the marine organism accretion on the blade 32 is brushing the back portion of the blade 32 first, then brushing the front portion of the blade 32. That is, only a half portion of the blade 32 is brushed in the mean time, so as to avoid resistance force caused by excess contact.

Therefore, the present invention has the following advantages through the above description.

1. The blade set connected to the guiding element rotates at the same time when revolving around the central axis, and the blades of the blade set present varied angle differences at different positions through the precise design of the tracks on the track disk. That is, the blades rotate at a variable angular velocity, thereby reducing the thrust born by the blades at the counterflow position, and improving the conversion efficiency of the water flow energy. In addition, by using the collector mask, change of the shape of the blades, and the variable angular velocity, a negative effect of an ineffective area is reduced, and positive output of an effective area is increased, thereby greatly enhancing the power generation efficiency of the waterwheel apparatus.

2. The guiding element is made of the abrasion resistant material, and is in contact with the side wall of the track trench of the track disk to form sliding friction. The blade connected to the guiding element is driven by the guiding element to rotate, and a transmission mechanism such as a gear is not needed.

3. During the maintenance and replacement of the guiding element, there is no need to particularly adjust the angle difference between the blades of the blade set connected to the guiding element. Since the angle of the blades is determined by the position of the connected guiding element in the track, the angle difference between the blades is maintained, which simplifies the maintenance step and accelerates the maintenance work.

4. Water may be used for lubrication when the guiding element moves in the track of the track disk, and the lubricating oil is not needed, so no leakage would occur to pollute the ocean.

5. The structure of the moving element is simple, so the types of the spares may be reduced.

6. When the track-type blade set is applied for power generation, the power generation efficiency may be improved; while when the track-type blade set is applied for water flow generation, the water flow is pushed to the same direction massively at low speed.

7. The blade set may synchronously remove the marine organism during operation, and the blade set is kept clean without accretion at any time, thereby preventing the accretion from affecting the operation efficiency, and prolonging the operation time of the blade set in water at the same time, so there is no need to manually remove the accretion on land.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. A track-type blade set, comprising:
   at least one track disk, having at least one track, a central axis, a peripheral portion and an inner portion, wherein the at least one track surrounds the central axis, and the at least one track is located between the peripheral portion and the inner portion, wherein the at least one track comprises a first track, a second track, a main spacing portion, a first auxiliary track, a second auxiliary track and a third auxiliary track, the main spacing portion is located between the first track and the second track, the first auxiliary track is located on a part of the main spacing portion, the second auxiliary track is located on a part of the peripheral portion, and the third auxiliary track is located on a part of the inner portion;

a plurality of moving elements, moving in the at least one track; and a plurality of blades, connected to the moving elements, wherein the blades rotate at a variable angular velocity when revolving around the central axis.

2. The track-type blade set according to claim 1, wherein horizontal levels of bottom surfaces of the first track and the second track are the same and are lower than a top surface of the main spacing portion, the main spacing portion is not fully closed while surrounding the central axis of the track disk, so that a part of the first track and a part of the second track are overlapped and communicated with each other.

3. The track-type blade set according to claim 1, wherein top surfaces of the peripheral portion, the inner portion and the main spacing portion are at the same horizontal level.

4. The track-type blade set according to claim 1, wherein the first auxiliary track, the second auxiliary track and the third auxiliary track are not continuous with each other, bottom surfaces of the first auxiliary track, the second auxiliary track and the third auxiliary track are lower than top surfaces of the peripheral portion, the inner portion and the main spacing portion, and are higher than bottom surfaces of the first track and the second track.

5. The track-type blade set according to claim 1, wherein the at least one track further has a first secondary spacing portion and a second secondary spacing portion, the first secondary spacing portion is located between the first track and the second auxiliary track, and the second secondary spacing portion is located between the second track and the third auxiliary track.

6. The track-type blade set according to claim 1, wherein the moving elements are in contact with a side wall of the at least one track.

7. The track-type blade set according to claim 1, wherein each moving element includes:

a main frame body; and two guiding elements, pivoted on two ends of the main frame body respectively, and located in the at least one track.

8. The track-type blade set according to claim 1, wherein each moving element includes:

a main frame body;

two extending portions, extending from two ends of the main frame body;

two main guiding elements, pivoted on two ends of the main frame body respectively, and located in the at least one track; and two secondary guiding elements, pivoted on one end of each extending portion, and located in the at least one track, wherein bottom surfaces of the secondary guiding elements are higher than top surfaces of the main guiding elements.

9. The track-type blade set according to claim 1, further comprising at least one rotating disk, wherein the rotating disk has a plurality of through holes, so that the blade connects to the moving element through the through holes, and the rotating disk rotates relatively to the track disk.

10. The track-type blade set according to claim 9, further comprising at least one central transmission shaft fixed to a center of the rotating disk, wherein the rotating disk is located between the track disk and the blades, and the central transmission shaft passes through the rotating disk.

11. The track-type blade set according to claim 10, further comprising a central connection shaft, wherein the blades surround the central connection shaft, and the central transmission shaft is fixed to the central connection shaft.

12. The track-type blade set according to claim 9, wherein the track-type blade set comprises two track disks and two rotating disks, which are located on two sides of the blades respectively.

13. The track-type blade set according to claim 9, wherein the blades are pushed by a water flow, the rotating disk rotates accordingly to drive an axle center of a power generator to rotate and generate power.

14. The track-type blade set according to claim 9, wherein the blades are pushed by a water flow, the rotating disk rotates accordingly to drive an axle center of a power unit to rotate and do work.

15. The track-type blade set according to claim 9, wherein the rotating disk is driven by a power source, the blades rotate accordingly to produce a flowing water flow.

16. The track-type blade set according to claim 1, wherein the track disk is rotatable so as to change the direction of a water flow.

17. A high efficiency waterwheel apparatus having track-type blades, comprising:

a frame; and at least one track-type blade set, fixed to the frame, each track-type blade set comprising:

at least one track disk, having at least one track, a central axis, a peripheral portion and an inner portion, wherein the at least one track surrounds the central axis, and the at least one track is located between the peripheral portion and the inner portion, wherein the at least one track comprises a first track, a second track, a main spacing portion, a first auxiliary track, a second auxiliary track and a third auxiliary track, the main spacing portion is located between the first track and the second track, the first auxiliary track is located on a part of the main spacing portion, the second auxiliary track is located on a part of the peripheral portion, and the third auxiliary track is located on a part of the inner portion;

a plurality of moving elements, moving in the at least one track; and a plurality of blades, connected to the moving elements, wherein the blades rotate at a variable angular velocity when revolving around the central axis.

18. The high efficiency waterwheel apparatus having track-type blades according to claim 17, wherein horizontal levels of bottom surfaces of the first track and the second track are the same and are lower than a top surface of the main spacing portion, the main spacing portion is not fully closed while surrounding the central axis of the track disk, so that a part of the first track and a part of the second track are overlapped and communicated with each other.

19. The high efficiency waterwheel apparatus having track-type blades according to claim 17, wherein top surfaces of the peripheral portion, the inner portion and the main spacing portion are at the same horizontal level.

20. The high efficiency waterwheel apparatus having track-type blades according to claim 17, wherein the first auxiliary track, the second auxiliary track and the third auxiliary track are not continuous with each other, bottom surfaces of the first auxiliary track, the second auxiliary track and the third auxiliary track are lower than the top surfaces of the peripheral portion, the inner portion and the main spacing portion, and are higher than bottom surfaces of the first track and the second track.

21. The high efficiency waterwheel apparatus having track-type blades according to claim 17, wherein the at least one track further has a first secondary spacing portion and a second secondary spacing portion, the first secondary spacing portion is located between the first track and the second auxiliary track, and the second secondary spacing portion is located between the second track and the third auxiliary track.

22. The high efficiency waterwheel apparatus having track-type blades according to claim 17, wherein the moving elements are in contact with a side wall of the at least one track.

23. The high efficiency waterwheel apparatus having track-type blades according to claim 17, wherein each moving element includes:
a main frame body; and
two guiding elements, pivoted on two ends of the main frame body respectively, and located in the at least one track.

24. The high efficiency waterwheel apparatus having track-type blades according to claim 17, wherein each moving element includes:
a main frame body;
two extending portions, extending from two ends of the main frame body;
two main guiding elements, pivoted on two ends of the main frame body respectively, and located in the at least one track; and
two secondary guiding elements, pivoted on one end of each extending portion, and located in the at least one track, wherein bottom surfaces of the secondary guiding elements are higher than top surfaces of the main guiding elements.

25. The high efficiency waterwheel apparatus having track-type blades according to claim 17, further comprising at least one rotating disk, wherein the rotating disk has a plurality of through holes, so that the blade connects to the moving element through the through holes, and the rotating disk rotates relatively to the track disk.

26. The high efficiency waterwheel apparatus having track-type blades according to claim 25, further comprising a power unit, wherein the power unit has an axle center, and the axle center rotates together with the rotating disk.

27. The high efficiency waterwheel apparatus having track-type blades according to claim 26, wherein the track-type blade set further comprises a central transmission shaft fixed to the center of the rotating disk, wherein the rotating disk is located between the track disk and the blades, and the central transmission shaft passes through the rotating disk and connects the axle center of the power unit.

28. The high efficiency waterwheel apparatus having track-type blades according to claim 27, wherein the track-type blade set further comprises a central connection shaft, wherein the blades surround the central connection shaft, and the central transmission shaft is fixed to the central connection shaft.

29. The high efficiency waterwheel apparatus having track-type blades according to claim 25, wherein the track-type blade set comprises two track disks and two rotating disks, which are located on two sides of the blades respectively.

30. The high efficiency waterwheel apparatus having track-type blades according to claim 26, wherein the power unit is a power generator, the blades are pushed by a water flow, the rotating disk rotates accordingly to drive an axle center of the power unit to rotate and generate power.

31. The high efficiency waterwheel apparatus having track-type blades according to claim 26, wherein the blades are pushed by a water flow, the rotating disk rotates accordingly to drive an axle center of a power unit to rotate and do work.

32. The high efficiency waterwheel apparatus having track-type blades according to claim 26, wherein the power unit is a power source, the rotating disk is driven by the power source, and the blades rotate accordingly to produce a flowing water flow.

33. The high efficiency waterwheel apparatus having track-type blades according to claim 17, wherein the track disk is rotatable so as to change the direction of a water flow.

34. The high efficiency waterwheel apparatus having track-type blades according to claim 17, further comprising a collector mask, wherein the collector mask covers the track-type blade set for guiding the direction of a water flow.

35. The high efficiency waterwheel apparatus having track-type blades according to claim 34, wherein the collector mask comprises at least two decontamination brushes, for removing the marine organism accretion on the track-type blade set when the track-type blade set rotates.

36. The high efficiency waterwheel apparatus having track-type blades according to claim 35, wherein the at least two decontamination brushes brush a back portion and a front portion of a blade in sequence respectively.

* * * * *